(12) United States Patent
Zhao et al.

(10) Patent No.: US 10,965,941 B2
(45) Date of Patent: Mar. 30, 2021

(54) POSITION-DEPENDENT PREDICTION COMBINATIONS IN VIDEO CODING

(71) Applicant: QUALCOMM Incorporated, San Diego, CA (US)

(72) Inventors: Xin Zhao, Santa Clara, CA (US); Vadim Seregin, San Diego, CA (US); Amir Said, San Diego, CA (US); Marta Karczewicz, San Diego, CA (US); Kai Zhang, San Diego, CA (US); Vijayaraghavan Thirumalai, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/154,261

(22) Filed: Oct. 8, 2018

(65) Prior Publication Data
US 2019/0110045 A1    Apr. 11, 2019

Related U.S. Application Data

(60) Provisional application No. 62/570,019, filed on Oct. 9, 2017.

(51) Int. Cl.
*H04N 7/12* (2006.01)
*H04N 19/11* (2014.01)
(Continued)

(52) U.S. Cl.
CPC .......... *H04N 19/11* (2014.11); *H04N 19/105* (2014.11); *H04N 19/117* (2014.11);
(Continued)

(58) Field of Classification Search
CPC .... H04N 19/105; H04N 19/11; H04N 19/117; H04N 19/167; H04N 19/176; H04N 19/182; H04N 19/593
See application file for complete search history.

(56) References Cited

U.S. PATENT DOCUMENTS 10,230,961 B2 *   3/2019   Liu ...................... H04N 19/122
10,425,648 B2 *   9/2019   Said .................... H04N 19/146
(Continued)

FOREIGN PATENT DOCUMENTS

| CN | 107071417 A | 8/2017 |
| WO | 2012102929 | 8/2012 |
| WO | 2017043816 A1 | 3/2017 |

OTHER PUBLICATIONS

Aubury M., et al., "Binomial Filters," Journal of VLSI Signal Processing, Kluwer Academic Publishers, Boston, Nov. 15, 1994, Revised Jul. 24, 1995, 27 pp.
(Continued)

*Primary Examiner* — Jessica M Prince
(74) *Attorney, Agent, or Firm* — Shumaker & Sieffert, P.A.

(57) ABSTRACT

A video coder may generate a predictor block using an intra prediction mode. As part of generating the predictor block, the video coder may, for each respective sample in a set of samples in the predictor block, determine, based on an initial value of the first weight and a distance between the respective sample and a first boundary of the predictor block, a value of the first weight for the respective sample. Additionally, the video coder may determine, based on the initial value of the second weight and a distance between the respective sample and a second boundary of the predictor block, a value of the second weight for the respective sample. The video coder may also determine a primary value for the respective sample. The video coder may then determine a secondary value for the respective sample based on the first weight, second weight, and the primary value.

36 Claims, 12 Drawing Sheets

(51) Int. Cl.
  *H04N 19/117* (2014.01)
  *H04N 19/176* (2014.01)
  *H04N 19/105* (2014.01)
  *H04N 19/593* (2014.01)
  *H04N 19/167* (2014.01)
  *H04N 19/182* (2014.01)
(52) U.S. Cl.
  CPC ......... *H04N 19/167* (2014.11); *H04N 19/176* (2014.11); *H04N 19/182* (2014.11); *H04N 19/593* (2014.11)

(56) References Cited

U.S. PATENT DOCUMENTS

| | | |
|---|---|---|
| 2009/0257492 A1 | 10/2009 | Andersson et al. |
| 2012/0183137 A1* | 7/2012 | Laughlin ............... H04N 7/185 380/200 |
| 2012/0195378 A1 | 8/2012 | Zheng et al. |
| 2012/0207216 A1 | 8/2012 | Yu et al. |
| 2012/0287995 A1 | 11/2012 | Budagavi |
| 2013/0182971 A1 | 7/2013 | Leontaris et al. |
| 2015/0023405 A1 | 1/2015 | Joshi et al. |
| 2015/0110174 A1 | 4/2015 | Gu et al. |
| 2017/0094285 A1 | 3/2017 | Said et al. |
| 2017/0272748 A1 | 9/2017 | Seregin et al. |
| 2018/0176587 A1* | 6/2018 | Panusopone ......... H04N 19/593 |
| 2018/0249156 A1 | 8/2018 | Heo et al. |
| 2018/0288408 A1 | 10/2018 | Ikai et al. |
| 2019/0089952 A1* | 3/2019 | Liu ....................... H04N 19/46 |
| 2020/0059650 A1 | 2/2020 | Lu et al. |
| 2020/0145671 A1 | 5/2020 | Filippov et al. |

OTHER PUBLICATIONS

Bossen F., "Common Test Conditions and Software Reference Configurations", Joint Collaborative Team on Video Coding (JCT-VC) of ITU-T SG16 WP3 and ISO/IEC JTC1/SC29/WG11, 12th Meeting: Geneva, CH Jan. 14-23, 2013, JCTVC-L1100, 4 Pages.
Chen, et al., "Preliminary version of High efficiency video coding (HEVC) scalable extension Draft 6," Joint Collaborative Team on Video Coding (JCT-VC) of ITU-T SG 6 WP 3 and ISO/IEC JTC 1, Document: JCTVC-Q1008v2, Mar. 27-Apr. 4, 2014, 160 pp.
Chen J., et al., "Further Improvements to HMKTA-1.0", 52. VCEG meeting, Jun. 19, 2015-Jun. 26, 2015, Warsaw, (Video Coding Experts Group of ITU-T SG.16), No. VCEG-AZ07, Jun. 19, 2015 (Jun. 19, 2015), XP030003885, the whole document, 8 pages.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
ITU-T H.261, Line Transmission of Non-Telephone Signals, Video Codec for Audiovisual Services At p x 64 kbits, The International Telecommunication Union, Mar. 1990, 32 pp.
ITU-T H.262 (Feb. 2000), "Information Technology—Generic Coding of Moving Pictures and Associated Audio Information: Video", Series H: Audiovisual and Multimedia Systems, Infrastructure of Audiovisual Services—Coding of Moving Video, Feb. 2000, 220 pages.
ITU-T H.263, "Video Coding for Low Bit Rate Communication", Series H: Audiovisual and Multimedia Systems, Infrastructure of audiovisual services—Coding of moving video, Jan. 2005, 226 pages.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, High efficiency video coding, The International Telecommunication Union, Apr. 2013, 317 pages.

"ITU-T H.265, Series H: Audiovisual and Multimedia Systems, Infrastructure of audiovisual services—Coding of moving video, High efficiency video coding," The International Telecommunication Union, Apr. 2015, 634 pp.
Lainema J., et al., "Intra Coding of the HEVC Standard", IEEE Transactions on Circuits and Systems for Video Technology, Institute of Electrical and Electronics Engineers, USA, vol. 22, No. 12, Dec. 1, 2012 (Dec. 1, 2012), XP011487148, pp. 1792-1801.
Said A., et al., "Position Dependent Intra Prediction Combination", Qualcomm Incorporated, International Organisation for Standardisation Organisation Internationale De Normalisation ISO/IEC JTC1/SC29/WG11 Coding of Moving Pictures and Audio, ISO/IEC JTC1/SC29/WG11 MPEG2015/M37502, Geneva, CH, Oct. 2015, 4 Pages.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI:10.1109/TCSVT.2012.2221191.
Tech G., et al., "MV-HEVC Draft Text 3", Joint Collaborative Team on 3D Video Coding Extension Development of ITU-T SG 16 WP 3 and ISO/IEC JTC 1/SC 29/WG 11, 3rd Meeting: Jan. 17-23, 2013, Geneva, CH, JCT3V-C1004_d3, XP002727084, 38 pp.
Tech G, et al., "MV-HEVC Draft Text 8", 8. JCT-3V Meeting, Mar. 29, 2014-Apr. 4, 2014, Valencia, (The Joint Collaborative Team on 3d Video Coding Extension Development of ISO/IEC JTC1/SC29/WG11 and ITU-T SG.16 ), URL: http://phenix.int-evry.fr/jct3v/, JCT3V-H1002-v5, Jun. 3, 2014, XP030132292, 163 pages.
Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.
Wien M., "High Efficiency Video Coding", Coding Tools and specification, Preface and Contents, 2015, 22 pages.
Zhang, et al., "Enhanced Cross-component Linear Model Intra-prediction," 4th Meeting; Chengdu, CN, Oct. 15-21, 2016, No. JVET-D0110v3, 6 pp.
Chen J., et al., "Algorithm Description of Joint Exploration Test Model 7 (JEM 7)," 7th Meeting; Joint Collaborative Team on Video Coding (JCT-VC) of ITU-T SG 16 WP 3 and ISO/IEC JTC 1/SC 29/WG 11, No. JVET-G1001v1, Jul. 13-21, 2017, 50 pp.
Bross, et al., "Versatile Video Coding (Draft 2)," 11th Meeting; Ljubljana, SI, Jul. 10-18, 2018, No. JVET-K1001v4, 86 pp.
Panusopone K., et al., "Unequal Weight Planar Prediction and Constrained PDPC", 5th JVET Meeting; Jan. 12, 2017-Jan. 20, 2017; Geneva; (The Joint Video Exploration Team of ISO/IEC JTC1/SC29/WG11 and ITU-T SG.16); URL: http://phenix.int-evry.fr/jvet/,,No. JVET-E0068, Jan. 5, 2017, XP030150550, 6 pages.
Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.
Bordes, et al., "Description of SDR, HDR and 360 Video Coding Technology Proposal by Qualcomm and Technicolor-Medium Complexity Version," JVET-J0022r1, 10th Meeting; San Diego, US, Apr. 10-20, 2018, (The Joint Video Exploration Team of ISO/IEC JTC1/SC29/WG11 and ITU-T SG.16); 84 pp.
Van der Auwera, et al., "CE3: Simplifed PDPC (Test 2.4.1)," JVET Meeting, 11th Meeting; Ljubljana, SI, Jul. 10-18, 2018, No. JVET-K0063, 6 pp.
Lorcy V., et al., "Proposed Improvements to the Adaptive Multiple Core Transform", 3 JVET Meeting, Joint Video Exploration Team (JVET) of ITU-T SG 16 WP 3 and ISO/IEC JTC 1/SC 29/WG 11, JVET-O0022, May 27, 2016, 4 pages, URL: http://phenix.int-evry.fr/jvet/,No. JVET-C0022.
Zhao, et al., "Improvements on AMT for Inter Prediction Residuals," JVET Meeting; (The Joint Video Exploration Team of ISO/IEC JTC1/SC29/WG11 and ITU-T SG.16), 4th Meeting: Chengdu, CN, Oct. 15-21, 2016, No. JVET-D0126, 2 pp.

(56) References Cited

OTHER PUBLICATIONS

Henry F., et al., "Residual Coefficient Sign Prediction", 4th JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/, No. JVET-D0031-v4, Oct. 20, 2016 (Oct. 20, 2016), XP030150258, 6 pages.
Zhao, et al., "Six tap intra interpolation filter," 4th Meeting; Chengdu, CN; Oct. 15-21, 2016, (The Joint Video Exploration Team of ISO/IEC JTC1/SC29/WG11 and ITU-T SG.16); Oct. 16, 2016, No. JVET-D0119, 3 pp.
Seregin V., et al., "Variable Number of Intra Modes", 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet, No. JVET-D0113, Oct. 6, 2016 (Oct. 6, 2016), XP030150359, pp. 1-2.
Chen et al., "Algorithm description for Versatile Video Coding and Test Model 1(VTM1)," 10th Meeting; San Diego, USA, Apr. 10-20, 2018; (The Joint Video Exploration Team of ISO/IEC JTC1/SC29/WG11 and ITU-T SG.16); Jun. 16, 2018, No. JVET-J1002, 10 pp.
Seregin et al., "Combined Results on Intra Methods," (The Joint Video Exploration Team of ISO/IEC JTC11 SC29/WG11 and ITU-T SG.16), 4th Meeting; Chengdu, CN, Oct. 15-21, 2016, No. JVET-D0115r2, 2 pp.
Han, et al., "Improvements to Intra Prediction Mode Coding," Joint Video Exploration Team (JVET) of ITU-T SG16 WP3 and ISO/IEC JTC1/SC29/WG11; 7th Meeting; Torino, IT, Jul. 13-21, 2017, document No. JVET-G0060, Jul. 5, 2017, 4 pp.
Chen et al., "Decoder-Side Motion Vector Refinement Based on Bilateral Template Matching", JVET Meeting, Joint Video Exploration Team {JVET) of ITU-T SG 16 WP 3 and ISO/IEC JTC 1/SC 29/WG 11, JVET-D0029, 4th Meeting; Chengdu, CN, Oct. 15-21, 2016, 4 pp.
Chen, et al., "Enhanced Motion Vector Difference Coding," JVET Meeting; (The Joint Video Exploration Team of ISO/IEC JTC1/SC29/WG11 and ITU-T SG.16), 4th Meeting: Chengdu, CN, Oct. 15-21, 2016, No. JVET-D0123_v3, 3 pp.
Chuang, et al., "EE2-related: A simplified gradient filter for Bi-directional optical flow (BIO)," Joint Video Exploration Team (JVET) of ITU-T SG 16 WP 3 and ISO/IEC JTC 1/SC 29/WG 11; 7th Meeting; Jul. 13-21, 2017, document No. JVET-G0083, Jul. 14, 2017, 5 pp.
Said A., et al., "Arithmetic Coding with Context-Dependent Double-Window Adaptation Response", 7. JVET Meeting, Jul. 13, 2017-Jul. 21, 2017, Torino, (The Joint Video Exploration Team of ISO/IEC JTC1/SC29/WG11 and ITU-T SG.16); URL: http://phenix.int-evry.fr/jvet/, No. JVET-G0112-v2, Jul. 14, 2017 (Jul. 14, 2017), XP030150916, pp. 1-4.
Said et al., "Binary arithmetic coding with small table or short multiplications," Jan. 12-20, 2017 {Joint Video Exploration Team {JVET) of ITU-T SG 16 WP 3 and ISO/IEC JTC 1/SC 29/WG 11) document No. JVET-E0119, Jan. 12, 2017, 4 pp.
Coban A., et al., "AHG8: Adjusted Cubemap Projection for 360-degree Video," 6th JVET Meeting; Mar. 31, 2017-Apr. 7, 2017; Hobart; (The Joint Video Exploration Team of ISO/IEC JTC1/SC29/WG11 and ITU-T SG.16); URL: http://phenix.int-evry.fr/jvet/,,No. JVET-F0025-v3, Apr. 2, 2017, XP030150675, 6 pages.
Coban, et al., "AHG8: Reference Picture Extension of ACP format 360-degree video," Joint Video Exploration Team (JVET) of ITU-T SG 16 WP 3 and ISO/IEC JTC 1/SC 29/WG 11; 7th Meeting; Torino, IT, Jul. 13-21, 2017, No. JVET-G0058, 4 pp.
Suhring, et al., "HEVC Software Guidelines", JVET Meeting; (The Joint Video Exploration Team of ISO/IEC JTC1/SC29/WG11 and ITU-T SG.16), 8th Meeting; San Jose, CA; Feb. 1-10, 2012, No. JCTVC-H1001, 8 pp.
Bossen et al., "JEM Software Manual," Joint Collaborative Team on Video coding (JCT-VC) of ITU-T SG16 WP3 and ISO/IEC JTC1/SC29/WG11, document: JCTVC-Software Manual, Aug. 3, 2016, 29 pp.
Van der Auwera, et al., "Description of Core Experiment 3: Intra Prediction and Mode Coding," 10th Meeting; San Diego, USA, Apr. 10-20, 2018; (The Joint Video Exploration Team of ISO/IEC JTC1/SC29/WG11 and ITU-T SG.16); Apr. 10-20, 2018, No. JVET-J1023, 50 pp.
He, et al., "360Lib Software Manual," Joint Collaborative Team on Video coding (JCT-VC) of ITU-T SG16 WP3 and ISO/IEC JTC1/SC29/WG11, document: JVET-360Lib, Software Manual, Nov. 1, 2017, 26 pp.
"CMake," accessed on Apr. 2, 2018, accessed from https://cmake.org/, 7 pp.
"ClangFormat," accessed on Apr. 2, 2018, accessed from https://clang.llvm.org/docs/ClangFormat.html, 4 pp.
Galpin, et al., "AHG9: CNN-based driving of block partitioning for intra slices encoding," (The Joint Video Exploration Team of ISO/IEC JTC1/SC29/WG11 and ITU-T SG.16); 10th Meeting; San Diego, US, Apr. 10-20, 2018; No. JVET-J0034, Apr. 13, 2018, 12 pp.
Van der Auwera, et al., "CE3: Summary Report on Intra Prediction and Mode Coding," 11th Meeting; Ljubljana, SI, Jul. 10-18, 2018, (The Joint Video Exploration Team of ISO/IEC JTC1/SC29/WG11 and ITU-T SG.16); Jul. 11, 2018, No. JVET-K0023, 34 pp.
Boyce, et al., "JVET common test conditions and software reference configurations," 10th Meeting; San Diego, USA, Apr. 10-20, 2018; (The Joint Video Exploration Team of ISO/IEC JTC1/SC29/WG11 and ITU-T SG.16); Jun. 14, 2018, No. JVET-J1010, 5 pp.
Zhao, et al., "EE1 related: Simplification and extension of PDPC," 8th Meeting; Macao, CN; Oct. 18-24, 2017; (The Joint Video Exploration Team of ISO/IEC JTC1/SC29/WG11 and ITU-T SG.16); Oct. 18, 2017, No. JVET-H0057, 3 pp.
Van der Auwera, et al., "Extension of Simplified PDPC to Diagonal Intra Modes," 10th Meeting; San Diego, USA, Apr. 10-20, 2018; (The Joint Video Exploration Team of ISO/IEC JTC1/SC29/WG11 and ITU-T SG.16); Apr. 14, 2018, No. JVET-J0069, 4 pp.
International Search Report and Written Opinion—PCT/US2018/054979—ISA/EPO—dated Jan. 16, 2019.
Van Der Auwera G., et al., "Extension of Simplified PDPC to Diagonal Intra Modes", 10. JVET Meeting, Apr. 10, 2018-Apr. 20, 2018, San Diego, (The Joint Video Exploration Team of ISO/IEC JTC1/SC29/WG11 and ITU-T SG.16), URL: http://PHENIX.INT-EVRY.FR/JVET/,,No. JVET-J0069,Apr. 3, 2018 (Apr. 3, 2018), XP030151261, pp. 1-4.
Zhao X., et al., "EE1 Related: Simplification and Extension of PDPC", 8.JVET Meeting, Oct. 18, 2017-Oct. 25, 2017, Macau, (The Joint Video Exploration Team of ISO/IEC JTC1/SC29/WG11 and ITU-T SG.16 ), URL:http://PHENIX.INT-EVRY.FR/JVET/,,No. JVET-H0057-v3, Oct. 18, 2017 (Oct. 18, 2017), XP030151 050, pp. 1-3.
Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: HTTP://PHENIX.INT-EVRY.FR/JVET/ ,, No. JVET-A1001 Feb. 24, 2016 (Feb. 24, 2016), XP030150000, 27 pages.

* cited by examiner

POSITION-DEPENDENT PREDICTION COMBINATIONS IN VIDEO CODING

This application claims the benefit of U.S. Provisional Patent Application 62/570,019, filed Oct. 9, 2017, the entire content of which is incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, smart phones, video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC) standard, and extensions of such standards. The video devices may transmit, receive, encode, decode, and/or store digital video information more efficiently by implementing such video compression techniques.

Video compression techniques may perform spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, such as coding tree blocks and coding blocks. Spatial or temporal prediction results in a predictor block for a block to be coded. Residual data represents pixel differences between the original block to be coded and the predictor block. For further compression, the residual data may be transformed from the pixel domain to a transform domain, resulting in residual transform coefficients, which then may be quantized.

SUMMARY

In general, this disclosure describes techniques related to intra prediction and intra mode coding. Techniques of this disclosure may be used in the context of advanced video codecs, such as extensions of HEVC or the next generation of video coding standards.

In one example, this disclosure describes a method of decoding video data, the method comprising: generating a predictor block using an intra prediction mode, wherein generating the predictor block comprises: determining an initial value of a first weight; determining an initial value of a second weight; for each respective sample in a set of samples in the predictor block: determining, based on the initial value of the first weight and a distance between the respective sample and a first boundary of the predictor block, a value of the first weight for the respective sample; determining, based on the initial value of the second weight and a distance between the respective sample and a second boundary of the predictor block, a value of the second weight for the respective sample; determining a value of a third weight for the respective sample; determining a value of a fourth weight for the respective sample based on the value of the first weight for the respective sample, the value of the second weight for the respective sample, and the value of the third weight for the respective sample; determining a primary value for the respective sample according to the intra prediction mode; and determining a secondary value for the respective sample as a first value for the respective sample right-shifted by a second value, the first value for the respective sample being a sum of (i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by an above-left reference sample for the respective sample that is above and left of the respective sample, (iv) the value of the fourth weight for the respective sample multiplied by the primary value for the respective sample, and (v) an offset value; and reconstructing, based on the predictor block and residual data, a decoded block of the video data.

In another example, this disclosure describes a method of encoding video data, the method comprising: generating a predictor block using an intra prediction mode, wherein generating the predictor block comprises: determining an initial value of a first weight; determining an initial value of a second weight; for each respective sample in a set of samples in the predictor block: determining, based on the initial value of the first weight and a distance between the respective sample and a first boundary of the predictor block, a value of the first weight for the respective sample; determining, based on the initial value of the second weight and a distance between the respective sample and a second boundary of the predictor block, a value of the second weight for the respective sample; determining a value of a third weight for the respective sample; determining a value of a fourth weight for the respective sample based on the value of the first weight for the respective sample, the value of the second weight for the respective sample, and the value of the third weight for the respective sample; determining a primary value for the respective sample according to the intra prediction mode; and determining a secondary value for the respective sample as a first value for the respective sample right-shifted by a second value, the first value for the respective sample being a sum of (i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by an above-left reference sample for the respective sample that is above and left of the respective sample, (iv) the value of the fourth weight for the respective sample multiplied by the primary value for the respective sample, and (v) an offset value; and generating residual data based on the predictor block and a coding block of the video data.

In another example, this disclosure describes an apparatus for decoding video data, the apparatus comprising: one or more storage media configured to store the video data; and one or more processors configured to: generate a predictor block using an intra prediction mode, wherein the one or more processors are configured such that, as part of generating the predictor block, the one or more processors: determine an initial value of a first weight; determine an initial value of a second weight; for each respective sample in a set of samples in the predictor block: determine, based on the initial value of the first weight and a distance between the respective sample and a first boundary of the predictor block, a value of the first weight for the respective sample; determine, based on the initial value of the second weight and a distance between the respective sample and a second boundary of the predictor block, a value of the second weight for the respective sample; determine a value of a third weight for the respective sample; determine a value of a fourth weight for the respective sample based on the value of the first weight for the respective sample, the value of the second weight for the respective sample, and the value of the third weight for the respective sample; determine a primary value for the respective sample according to the intra prediction mode; and determine a secondary value for the respective sample as a first value for the respective sample right-shifted by a second value, the first value for the respective sample being a sum of (i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by an above-left reference sample for the respective sample that is above and left of the respective sample, (iv) the value of the fourth weight for the respective sample multiplied by the primary value for the respective sample, and (v) an offset value; and reconstruct, based on the predictor block and residual data, a decoded block of the video data.

In another example, this disclosure describes an apparatus for encoding video data, the apparatus comprising: one or more storage media configured to store the video data; and one or more processors configured to: generate a predictor block using an intra prediction mode, wherein the one or more processors are configured such that, as part of generating the predictor block, the one or more processors: determine an initial value of a first weight; determine an initial value of a second weight; for each respective sample in a set of samples in the predictor block: determine, based on the initial value of the first weight and a distance between the respective sample and a first boundary of the predictor block, a value of the first weight for the respective sample; determine, based on the initial value of the second weight and a distance between the respective sample and a second boundary of the predictor block, a value of the second weight for the respective sample; determine a value of a third weight for the respective sample; determine a value of a fourth weight for the respective sample based on the value of the first weight for the respective sample, the value of the second weight for the respective sample, and the value of the third weight for the respective sample; determine a primary value for the respective sample according to the intra prediction mode; and determine a secondary value for the respective sample as a first value for the respective sample right-shifted by a second value, the first value for the respective sample being a sum of (i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by an above-left reference sample for the respective sample that is above and left of the respective sample, (iv) the value of the fourth weight for the respective sample multiplied by the primary value for the respective sample, and (v) an offset value; and generate residual data based on the predictor block and a coding block of the video data.

In another example, this disclosure describes an apparatus for decoding video data, the apparatus comprising: means for storing the video data; and means for generating a predictor block using an intra prediction mode, wherein the means for generating the predictor block comprises: means for determining an initial value of a first weight; means for determining an initial value of a second weight; for each respective sample in a set of samples in the predictor block: means for determining, based on the initial value of the first weight and a distance between the respective sample and a first boundary of the predictor block, a value of the first weight for the respective sample; means for determining, based on the initial value of the second weight and a distance between the respective sample and a second boundary of the predictor block, a value of the second weight for the respective sample; means for determining a value of a third weight for the respective sample; means for determining a value of a fourth weight for the respective sample based on the value of the first weight for the respective sample, the value of the second weight for the respective sample, and the value of the third weight for the respective sample; means for determining a primary value for the respective sample according to the intra prediction mode; and means for determining a secondary value for the respective sample as a first value for the respective sample right-shifted by a second value, the first value for the respective sample being a sum of (i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by an above-left reference sample for the respective sample that is above and left of the respective sample, (iv) the value of the fourth weight for the respective sample multiplied by the primary value for the respective sample, and (v) an offset value; and means for reconstructing, based on the predictor block and residual data, a decoded block of the video data.

In another example, this disclosure describes an apparatus for encoding video data, the apparatus comprising: means for storing the video data; and means for generating a predictor block using an intra prediction mode, wherein the means for generating the predictor block comprises: means for determining an initial value of a first weight; means for determining an initial value of a second weight; for each respective sample in a set of samples in the predictor block: means for determining, based on the initial value of the first weight and a distance between the respective sample and a first boundary of the predictor block, a value of the first weight for the respective sample; means for determining, based on the initial value of the second weight and a distance between the respective sample and a second boundary of the predictor block, a value of the second weight for the respective sample; means for determining a value of a third weight for the respective sample; means for determining a value of a fourth weight for the respective sample based on the value of the first weight for the respective sample, the value of the second weight for the respective sample, and the value of the third weight for the respective sample; means for determining a primary value for the respective sample according to the intra prediction mode; and means for determining a secondary value for the respective sample as a first value for the respective sample right-shifted by a second value, the first value for the respective sample being a sum of (i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by an above-left reference sample for the respective sample that is above and left of the respective sample, (iv) the value of the fourth weight for the respective sample multiplied by the primary value for the respective sample, and (v) an offset value; and means for generating residual data based on the predictor block and a coding block of the video data.

In another example, this disclosure describes a computer-readable storage medium having instructions stored thereon that, when executed, cause one or more processors to: generate a predictor block using an intra prediction mode, wherein the one or more processors are configured such that, as part of generating the predictor block, the one or more processors: determine an initial value of a first weight; determine an initial value of a second weight; for each respective sample in a set of samples in the predictor block: determine, based on the initial value of the first weight and a distance between the respective sample and a first boundary of the predictor block, a value of the first weight for the respective sample; determine, based on the initial value of the second weight and a distance between the respective sample and a second boundary of the predictor block, a value of the second weight for the respective sample; determine a value of a third weight for the respective sample; determine a value of a fourth weight for the respective sample based on the value of the first weight for the respective sample, the value of the second weight for the respective sample, and the value of the third weight for the respective sample; determine a primary value for the respective sample according to the intra prediction mode; and determine a secondary value for the respective sample as a first value for the respective sample right-shifted by a second value, the first value for the respective sample being a sum of (i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by an above-left reference sample for the respective sample that is above and left of the respective sample, (iv) the value of the fourth weight for the respective sample multiplied by the primary value for the respective sample, and (v) an offset value; and reconstruct, based on the predictor block and residual data, a decoded block of video data.

In another example, this disclosure describes a computer-readable storage medium having instructions stored thereon that, when executed, cause one or more processors to: generate a predictor block using an intra prediction mode, wherein the one or more processors are configured such that, as part of generating the predictor block, the one or more processors: determine an initial value of a first weight; determine an initial value of a second weight; for each respective sample in a set of samples in the predictor block: determine, based on the initial value of the first weight and a distance between the respective sample and a first boundary of the predictor block, a value of the first weight for the respective sample; determine, based on the initial value of the second weight and a distance between the respective sample and a second boundary of the predictor block, a value of the second weight for the respective sample; determine a value of a third weight for the respective sample; determine a value of a fourth weight for the respective sample based on the value of the first weight for the respective sample, the value of the second weight for the respective sample, and the value of the third weight for the respective sample; determine a primary value for the respective sample according to the intra prediction mode; and determine a secondary value for the respective sample as a first value for the respective sample right-shifted by a second value, the first value for the respective sample being a sum of (i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by an above-left reference sample for the respective sample that is above and left of the respective sample, (iv) the value of the fourth weight for the respective sample multiplied by the primary value for the respective sample, and (v) an offset value; and generate residual data based on the predictor block and a coding block of the video data.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
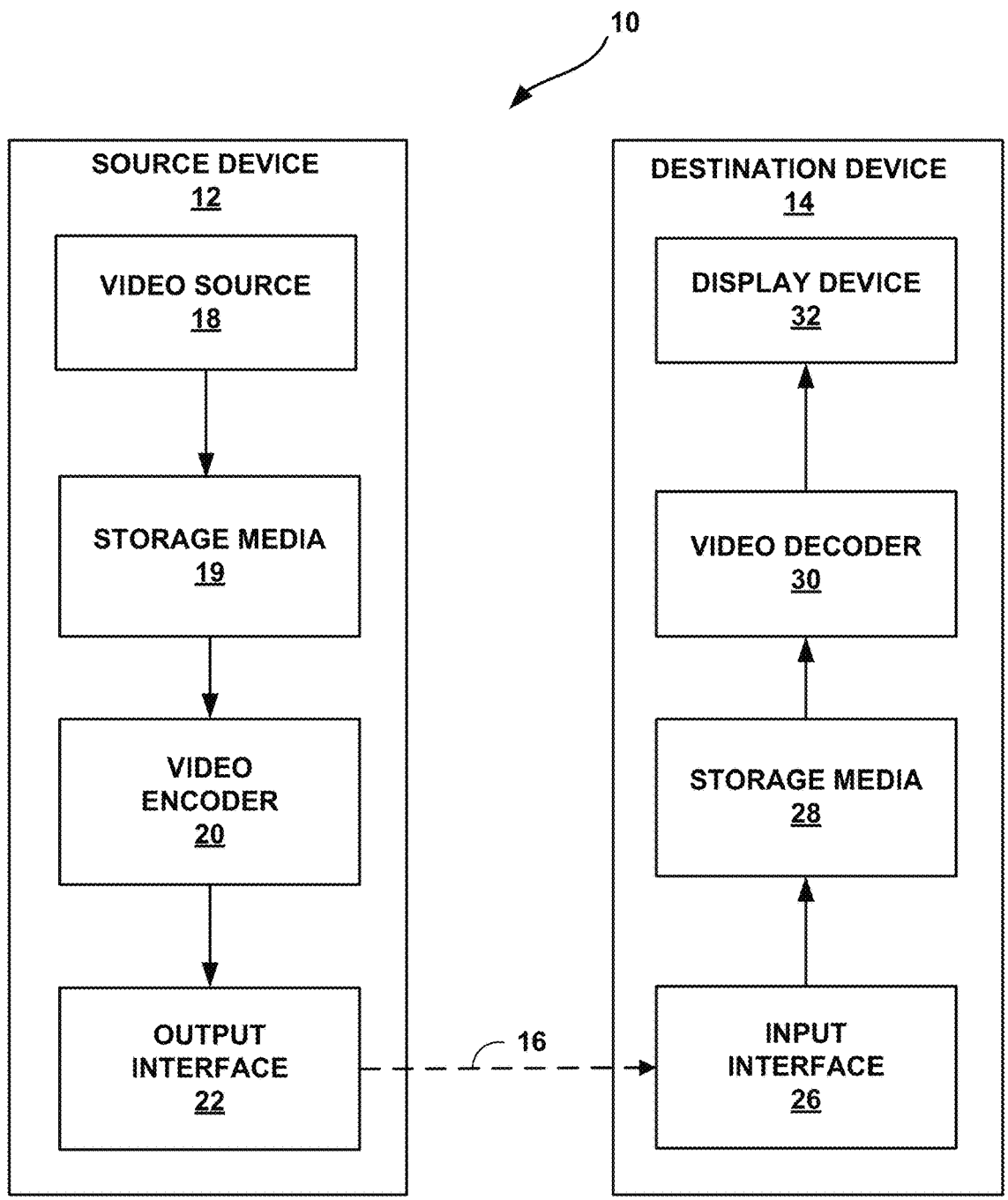
FIG. 1 is a block diagram illustrating an example video encoding and decoding system that may use one or more techniques described in this disclosure.

A video coder (e.g., a video encoder or a video decoder) may use intra prediction to generate a predictor block for a current block of a current picture. In general, when using intra prediction to generate a predictor block, the video coder determines a set of reference samples in a column left of the current block in the current picture and/or in a row above the current block in the current picture. The video coder may then use the reference samples to determine values of samples in the predictor block.

In High Efficiency Video Coding (HEVC) and other video coding standards, the video coder performs intra reference smoothing. When the video coder performs intra reference smoothing, the video coder applies a filter to the reference samples prior to using the reference samples to determine predicted values of samples in the predictor block. For instance, the video coder may apply a 2-tap bilinear filter, a 3-tap (1,2,1)/4 filter, or a mode-dependent intra smoothing filter to the reference samples. In the filter description above, the '/4' denotes normalization by dividing results by 4. Typically, performing intra reference smoothing improves prediction accuracy, especially when the current block represents a smoothly varying gradient.

While intra reference smoothing may improve prediction accuracy in many situations, there are other situations in which it may be beneficial to use the unfiltered reference samples. Position-dependent prediction combination (PDPC) is a scheme that has been devised to address these issues and improve intra prediction. In the PDPC scheme, a video coder determines a value of a predictor block sample based on the filtered reference samples, unfiltered reference samples, and the position of the predictor block sample within the predictor block. Use of the PDPC scheme may be associated with coding efficiency gains. For instance, the same amount of video data may be encoded using fewer bits.

Despite the coding efficiency gains associated with use of the PDPC scheme described above, there are several drawbacks. For example, the PDPC scheme is limited to the planar mode only to control encoder complexity, which may limit the coding gain contributed by the PDPC scheme.

This disclosure describes techniques that may improve the PDPC scheme described above, resulting in a simplified PDPC scheme. For instance, in accordance with one example technique of this disclosure, a video coder (e.g., a video encoder or a video decoder) generates a predictor block using an intra prediction mode. As part of generating the predictor block, the video coder may determine an initial value of a first weight and determine an initial value of a second weight. Furthermore, for each respective sample in a set of samples in the predictor block, the video coder may determine, based on the initial value of the first weight and a distance between the respective sample and a first boundary of the predictor block, a value of the first weight for the respective sample. The video coder may also determine, based on the initial value of the second weight and a distance between the respective sample and a second boundary of the predictor block, a value of the second weight for the respective sample. Furthermore, the video coder may determine a value of a third weight for the respective sample. The video coder may also determine a value of a fourth weight for the respective sample based on the value of the first weight for the respective sample, the value of the second weight for the respective sample, and the value of the third weight for the respective sample. Additionally, the video coder may determine a primary value for the respective sample according to the intra prediction mode. Next, the video coder may determine a secondary value for the respective sample as a first value for the respective sample right-shifted by a second value, the first value for the respective sample being a sum of:

(i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by an above-left reference sample for the respective sample that is above and left of the respective sample, (iv) the value of the fourth weight for the respective sample multiplied by the primary value for the respective sample, and (v) an offset value.

In this example, the intra prediction mode is not necessarily limited to the planar mode. Rather, the PDPC techniques described in this example may be used with other intra prediction modes, potentially resulting in improved compression performance. Moreover, the design of this disclosure may avoid the use of division operations, which may simplify implementation, conserve power, and accelerate decoding.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the encoded video data to destination device 14 via a computer-readable medium 16. Source device 12 and destination device 14 may include any of a wide range of devices or apparatuses, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 12 and destination device 14 are equipped for wireless communication. Thus, source device 12 and destination device 14 may be wireless communication devices. The techniques described in this disclosure may be applied to wireless and/or wired applications. Source device 12 is an example video encoding device (i.e., a device for encoding video data). Destination device 14 is an example video decoding device (i.e., a device for decoding video data).

The illustrated system 10 of FIG. 1 is merely one example. Techniques for processing video data may be performed by any digital video encoding and/or decoding device. In some examples, the techniques may be performed by a video encoder/decoder, typically referred to as a "CODEC." Source device 12 and destination device 14 are examples of such coding devices in which source device 12 generates coded video data for transmission to destination device 14. In some examples, source device 12 and destination device 14 operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

In the example of FIG. 1, source device 12 includes a video source 18, storage media 19 configured to store video data, a video encoder 20, and an output interface 22. Destination device 14 includes an input interface 26, storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

Video source 18 is a source of video data. The video data may include a series of pictures. Video source 18 may include a video capture device, such as a video camera, a video archive containing previously captured video, and/or a video feed interface to receive video data from a video content provider. In some examples, video source 18 generates computer graphics-based video data, or a combination of live video, archived video, and computer-generated video. Storage media 19 may be configured to store the video data. In each case, the captured, pre-captured, or computer-generated video may be encoded by video encoder 20.

Output interface 22 may output the encoded video information to a computer-readable medium 16. Output interface 22 may include various types of components or devices. For example, output interface 22 may include a wireless transmitter, a modem, a wired networking component (e.g., an Ethernet card), or another physical component. In examples where output interface 22 includes a wireless transmitter, output interface 22 may be configured to transmit data, such as encoded video data, modulated according to a cellular communication standard, such as 4G, 4G-LTE, LTE Advanced, 5G, and the like. In some examples where output interface 22 includes a wireless transmitter, output interface 22 may be configured to transmit data, such as encoded video data, modulated according to other wireless standards, such as an IEEE 802.11 specification, an IEEE 802.15 specification (e.g., ZigBee™), a Bluetooth™ standard, and the like. In some examples, circuitry of output interface 22 is integrated into circuitry of video encoder 20 and/or other components of source device 12. For example, video encoder 20 and output interface 22 may be parts of a system on a chip (SoC). The SoC may also include other components, such as a general purpose microprocessor, a graphics processing unit, and so on.

Destination device 14 may receive encoded video data to be decoded via computer-readable medium 16. Computer-readable medium 16 may include any type of medium or device capable of moving the encoded video data from source device 12 to destination device 14. In some examples, computer-readable medium 16 includes a communication medium to enable source device 12 to transmit encoded video data directly to destination device 14 in real-time. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may include one or more data storage media configured to store encoded video data and decoded video data.

In some examples, output interface 22 may output data, such as encoded video data, to an intermediate device, such as a storage device. Similarly, input interface 26 of destination device 14 may receive encoded data from the intermediate device. The intermediate device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In some examples, the intermediate device corresponds to a file server. Example file servers include web servers, FTP servers, network attached storage (NAS) devices, or local disk drives.

Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives data from computer-readable medium 16. Input interface 26 may include various types of components or devices. For example, input interface 26 may include a wireless receiver, a modem, a wired networking component (e.g., an Ethernet card), or another physical component. In examples where input interface 26 includes a wireless receiver, input interface 26 may be configured to receive data, such as the bitstream, modulated according to a cellular communication standard, such as 4G, 4G-LTE, LTE Advanced, 5G, and the like. In some examples where input interface 26 includes a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general purpose microprocessor, a graphics processing unit, and so on.

Storage media 28 may be configured to store encoded video data, such as encoded video data (e.g., a bitstream) received by input interface 26. Display device 32 displays the decoded video data to a user. Display device 32 may include any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 encode and decode video data according to a video coding standard or specification. For example, video encoder 20 and video decoder 30 may encode and decode video data according to ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions, or another video coding standard or specification. In some examples, video encoder 20 and video decoder 30 encode and decode video data according to the High Efficiency Video Coding (HEVC), which as known as ITU-T H.265, its range and screen content coding extensions, its 3D video coding extension (3D-HEVC), its multiview extension (MV-HEVC), or its scalable extension (SHVC). A Joint Video Exploration Team (JVET) is currently developing the Versatile Video Coding (VVC) standard based on the Joint Exploration Model.

This disclosure may generally refer to "signaling" certain information, such as syntax elements. The term "signaling" may generally refer to the communication of syntax elements and/or other data used to decode the encoded video data. Such communication may occur in real- or near-real-time. Alternately, such communication may occur over a span of time, such as might occur when storing syntax elements to a computer-readable storage medium in a bitstream at the time of encoding, which then may be retrieved by a decoding device at any time after being stored to this medium.

Video data includes a series of pictures. Pictures may also be referred to as "frames." A picture may include one or more sample arrays. Each respective sample array of a picture includes a 2-dimensional array of samples for a respective color component. For example, a picture may include a 2-dimensional array of luma samples, a two-dimensional array of Cb chroma samples, and a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. This disclosure may refer to an encoded representation of a picture as a "coded picture" or an "encoded picture."

As part of generating an encoded representation of a picture, video encoder 20 encodes blocks of samples in the sample arrays of the picture. A block is a 2-dimensional array of data, such as a 2-dimensional array of samples. Video encoder 20 may include, in a bitstream, an encoded representation of a block.

In some examples, to encode a block of the picture, video encoder 20 performs intra prediction or inter prediction to generate one or more predictor blocks for the block. Additionally, video encoder 20 may generate residual data for the block. The residual block includes residual samples. Each residual sample may indicate a difference between a sample of one of the generated predictor blocks and a corresponding sample of the block. Video encoder 20 may apply a transform to blocks of residual samples to generate transform coefficients. Furthermore, video encoder 20 may quantize the transform coefficients. In some examples, video encoder 20 may generate one or more syntax elements to represent a transform coefficient. Video encoder 20 may entropy encode one or more of the syntax elements representing the transform coefficient.

In some video coding specifications, to generate an encoded representation of a picture, video encoder 20 partitions each sample array of the picture into coding tree blocks (CTBs) and encodes the CTBs. A CTB is an N×N block of samples in a sample array of a picture. For example, a CTB can range in size from 16×16 to 64×64.

A coding tree unit (CTU) of a picture includes one or more collocated CTBs and syntax structures used to encode the samples of the one or more collocated CTBs. For instance, each CTU may include a CTB of luma samples of a picture, two corresponding CTBs of chroma samples of the picture, and syntax structures used to encode the samples of the CTBs. In monochrome pictures or pictures having three separate color planes, a CTU may include a single CTB and syntax structures used to encode the samples of the CTB. A CTU may also be referred to as a "tree block" or a "largest coding unit" (LCU). In this disclosure, a "syntax structure" may be defined as zero or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may partition the coding tree blocks of the CTU to partition the CTBs of the CTU into coding blocks according to a tree structure, hence the name "coding tree units."

A coding unit (CU) includes one or more coding blocks and syntax structures used to encode samples of the one or more coding blocks. For example, a CU may include a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may include a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may include one or more prediction blocks of a CU and syntax structures used to predict the one or more prediction blocks. For example, a PU may include a prediction block of luma samples, two corresponding prediction blocks of chroma samples, and syntax structures used to predict the prediction blocks. In monochrome pictures or pictures having three separate color planes, a PU may include a single prediction block and syntax structures used to predict the prediction block. In other codecs, video encoder 20 does not partition a coding block of a CU into prediction blocks. Rather, prediction occurs at the CU level. Thus, the coding block of a CU may be synonymous with a prediction block of a CU.

Video encoder 20 may generate a predictor block (e.g., a luma, Cb, and Cr predictor block) for a prediction block (e.g., luma, Cb, and Cr prediction block) of a CU. Video encoder 20 may use intra prediction or inter prediction to generate a predictor block. If video encoder 20 uses intra prediction to generate a predictor block, video encoder 20 may generate the predictor block based on decoded samples of the picture that includes the CU. If video encoder 20 uses inter prediction to generate a predictor block of a current picture, video encoder 20 may generate the predictor block based on decoded samples of a reference picture (i.e., a picture other than the current picture).

A video coder, such as video encoder 20 or video decoder 30, may perform intra prediction using an intra prediction mode selected from available intra prediction modes. The intra prediction modes may include directional intra prediction modes, which may also be referred to as intra prediction directions. Different directional intra prediction modes correspond to different angles. In some examples, to determine a value of a current sample of a predictor block using a directional intra prediction mode, the video coder may determine a point where a line passing through the current sample at the angle corresponding to the directional intra prediction mode intersects a set of border samples. The border samples may include samples in a column immediately left of the predictor block and samples in a row immediately above the predictor block. If the point is between two of the border samples, the video coder may interpolate or otherwise determine a value corresponding to the point. If the point corresponds to a single one of the border samples, the video coder may determine that the value of the point is equal to the border sample. The video coder may set the value of the current sample of the predictor block equal to the determined value of the point.

Video encoder 20 may generate one or more residual blocks for the CU. For instance, video encoder 20 may generate a separate residual for each color component (e.g., luma, Cb, and Cr). Each sample in a residual block of the CU for a color component indicates a difference between a sample in a predictor block of the CU for the color component and a corresponding sample in the coding block of the CU for the color component.

In some video coding standards, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may include one or more transform blocks. Video encoder 20 may apply one or more transforms to a transform block of a TU to generate a coefficient block for the TU. A coefficient block is a two-dimensional array of transform coefficients. Video encoder 20 may generate syntax elements indicating some or all the potentially quantized transform coefficients. Video encoder 20 may entropy encode (e.g., using Context-Adaptive Binary Arithmetic Coding (CABAC)) one or more of the syntax elements indicating a quantized transform coefficient.

Video encoder 20 may output a bitstream that includes encoded video data. In other words, video encoder 20 may output a bitstream that includes an encoded representation of video data. The encoded representation of the video data may include an encoded representation of pictures of the video data. For example, the bitstream may include a sequence of bits that forms a representation of encoded pictures of the video data and associated data. In some examples, a representation of an encoded picture may include encoded representations of blocks of the picture.

Video decoder 30 may receive a bitstream generated by video encoder 20. As noted above, the bitstream may include an encoded representation of video data. Video decoder 30 may decode the bitstream to reconstruct pictures of the video data. As part of decoding the bitstream, video decoder 30 obtains syntax elements from the bitstream. Video decoder 30 reconstructs pictures of the video data based at least in part on the syntax elements obtained from the bitstream. The process to reconstruct pictures of the video data may be generally reciprocal to the process performed by video encoder 20 to encode the pictures.

For instance, as part of decoding a picture of the video data, video decoder 30 may use inter prediction or intra prediction to generate predictor blocks for CUs of the picture. Additionally, video decoder 30 may determine transform coefficients based on syntax elements obtained from the bitstream. In some examples, video decoder 30 inverse quantizes the determined transform coefficients. Inverse quantization maps a quantized value to a reconstructed value. For instance, video decoder 30 may inverse quantize a value by determining the value multiplied by a quantization step size. Furthermore, video decoder 30 may apply an inverse transform on the determined transform coefficients to determine values of residual samples. Video decoder 30 may reconstruct a block of the picture based on the residual samples and corresponding samples of the generated predictor blocks. For instance, video decoder 30 may add residual samples to corresponding samples of the generated predictor blocks to determine reconstructed samples of the block.

More specifically, video decoder 30 may use inter prediction or intra prediction to generate one or more predictor blocks for each PU of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct a coding block of the current CU based on samples of the predictor blocks of the PUs of the current CU and residual samples of the transform blocks of the TUs of the current CU. In some examples, video decoder 30 may reconstruct the coding blocks of the current CU by adding the samples of the predictor blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of blocks of the picture. For example, a slice of a picture may include an integer number of CTUs of the picture. The CTUs of a slice may be ordered consecutively in a scan order, such as a raster scan order. In some codecs, a slice is defined as an integer number of CTUs contained in one independent slice segment and all subsequent dependent slice segments (if any) that precede the next independent slice segment (if any) within the same access unit. Furthermore, in some codecs, a slice segment is defined as an integer number of CTUs ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. A tile is a rectangular region of CTBs within a particular tile column and a particular tile row in a picture.

Figure 2:
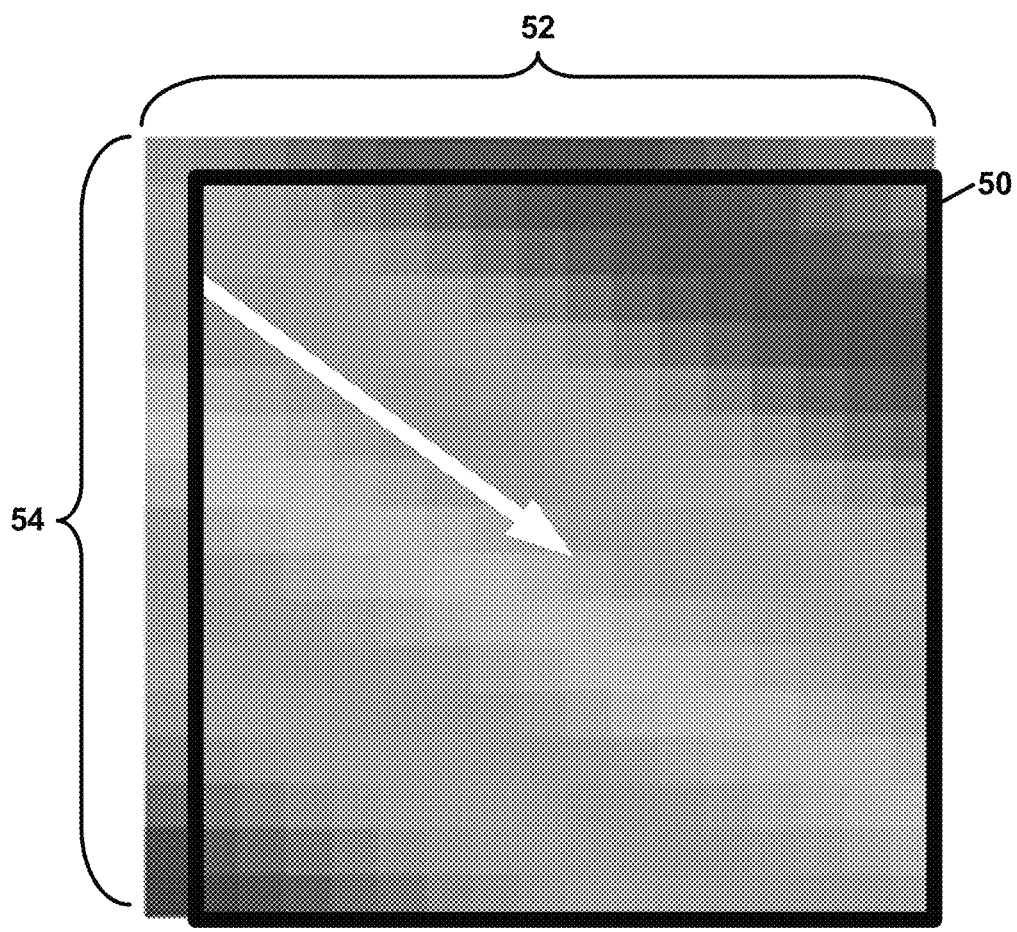
FIG. 2 illustrates an example of intra prediction for a 16×16 block.

Intra prediction performs image block prediction using the block's spatially neighboring reconstructed image samples. A typical example of the intra prediction for a 16×16 image block is shown in FIG. 2. With intra prediction, the 16×16 image block (in dark outlined square) is predicted by the above and left neighboring reconstructed samples (reference samples) along a selected prediction direction (as indicated by the white arrow). In FIG. 2, a block square contains a 16×16 block 50. In FIG. 2, block 50 is predicted by the above and left neighboring reconstructed samples 52, 54 (i.e., reference samples) along a selected prediction direction. In FIG. 2, the samples outside the black box are the reference samples. The white arrow in FIG. 2 indicates the selected prediction direction.

Figure 3:
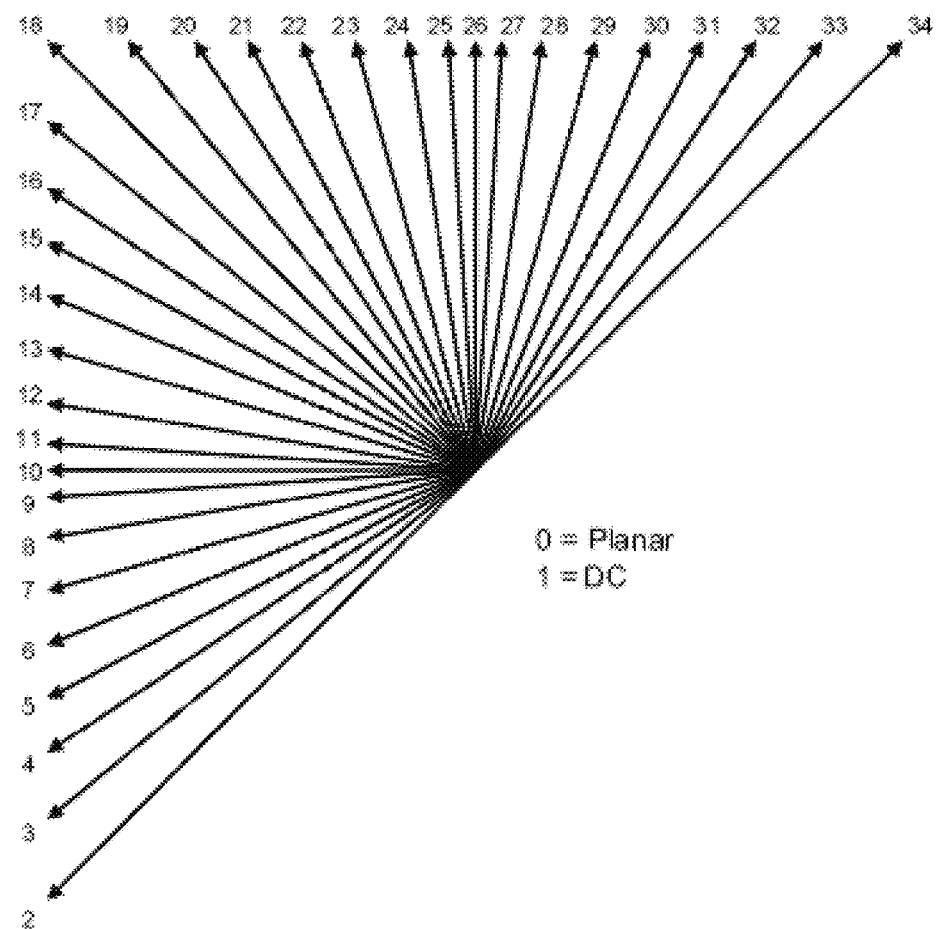
FIG. 3 illustrates example intra prediction modes.

FIG. 3 illustrates example intra prediction modes. In some examples, the intra prediction of a luma block includes 35 modes, including the Planar mode, DC mode and 33 angular modes. The 35 modes of the intra prediction are indexed as shown in the table below.

TABLE 1

Specification of intra prediction mode and associated names

| Intra prediction mode | Associated name |
|---|---|
| 0 | INTRA_PLANAR |
| 1 | INTRA_DC |
| 2 ... 34 | INTRA_ANGULAR2 ... INTRA_ANGULAR34 |

Figure 4:
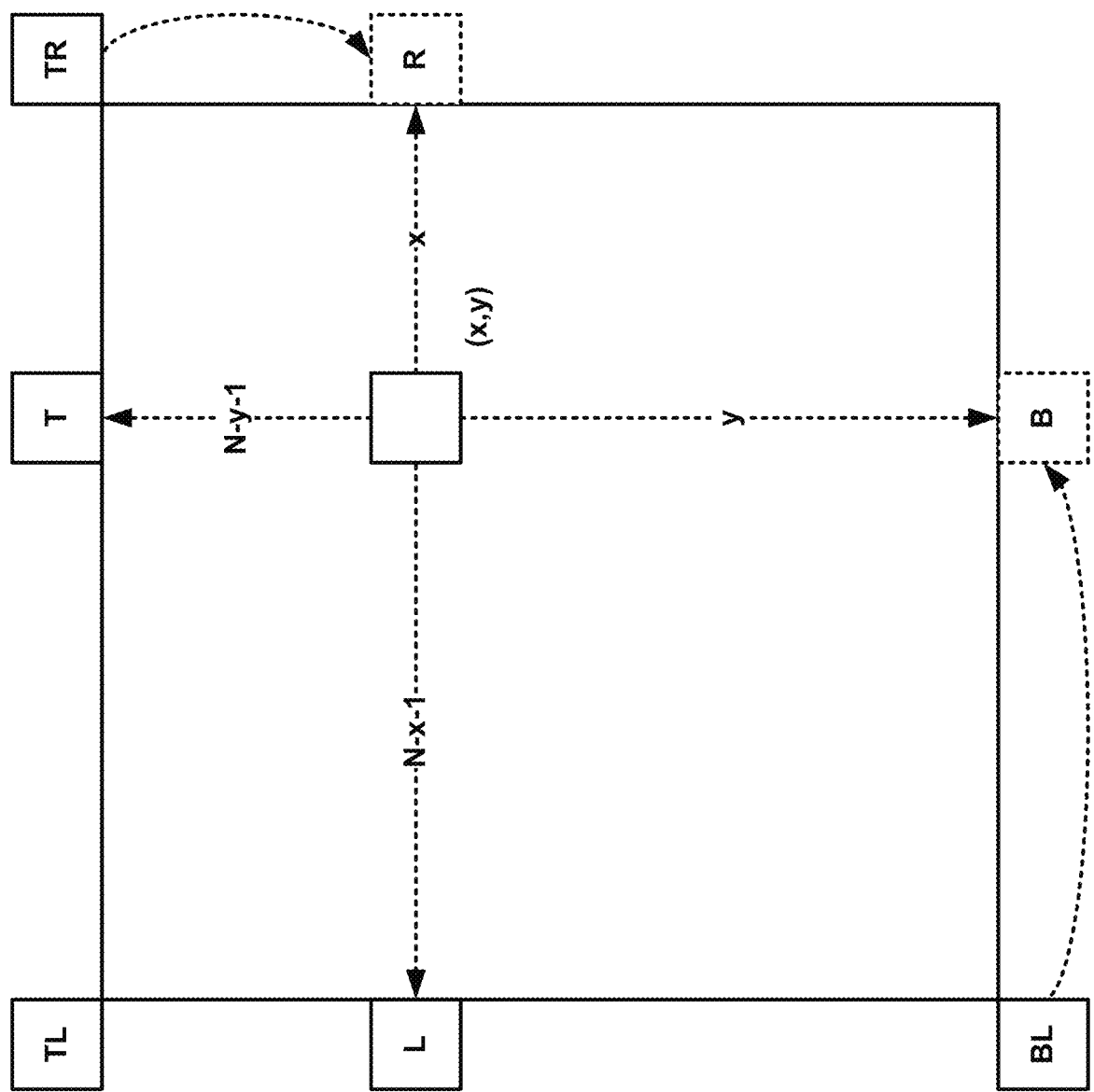
FIG. 4 is a conceptual diagram illustrating an example of planar mode as defined in HEVC.

FIG. 4 is a conceptual diagram illustrating an example of Planar mode. For Planar mode, which is typically the most-frequently used intra prediction mode, the prediction sample is generated as shown in FIG. 4. To perform Planar prediction for an N×N block, for each sample $p_{xy}$ located at (x, y), the prediction value may be calculated by applying a bilinear filter to four specific neighboring reconstructed samples, i.e., reference samples. The four reference samples include the top-right reconstructed sample TR, the bottom-left reconstructed sample BL, and the two reconstructed samples located at the same column ($r_{x,-1}$) and row ($r_{-1,y}$) of the current sample. The planar mode can be formulated as below:

$$p_{xy}=((N-x1)\cdot L+(N-y1)\cdot T+x1\cdot R+y1\cdot B)/(2*N)$$

where x1=x+1, y1=y+1, R=TR and B=BL.

For DC mode, the predictor block is filled with the average value of the neighboring reconstructed samples. Generally, both Planar and DC modes are applied for modeling smoothly varying and constant image regions.

For angular intra prediction modes in HEVC, which include 33 different prediction directions, the intra prediction process can be described as follows. For each given angular intra prediction mode, the intra prediction direction can be identified accordingly; for example, according to FIG. 3, intra mode 18 corresponds to a pure horizontal prediction direction, and intra mode 26 corresponds to a pure vertical prediction direction. Thus, in the example of FIG. 3, intra mode 18 corresponds to the horizontal mode and intra mode 26 corresponds to the vertical mode.

Figure 5:
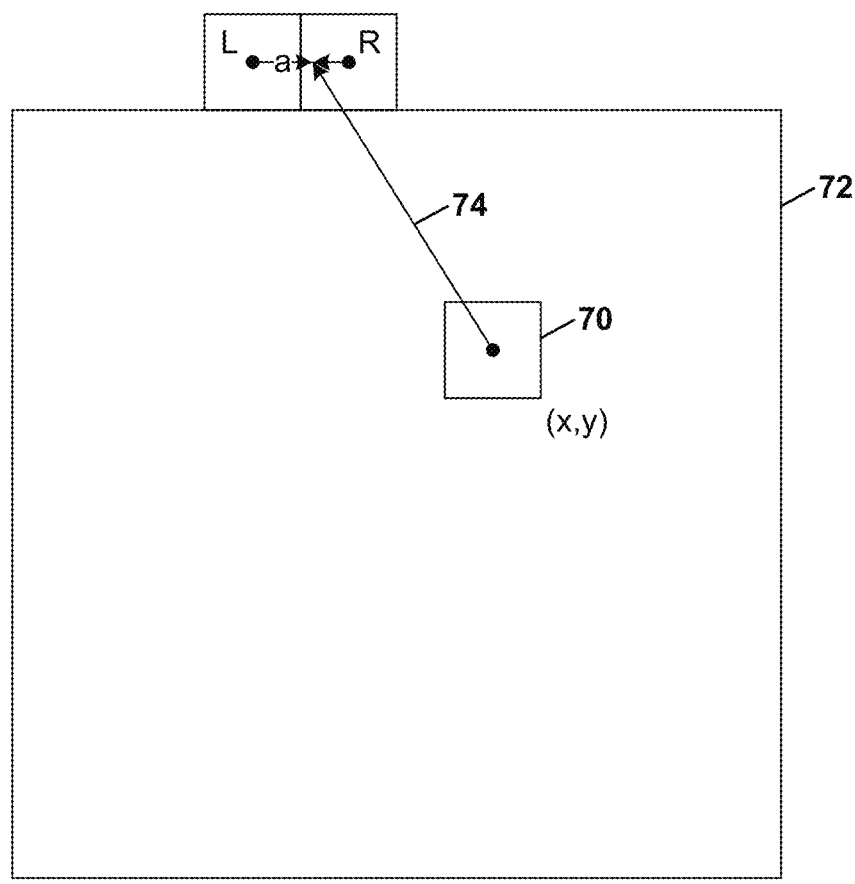
FIG. 5 is a conceptual diagram illustrating an example of an angular intra prediction mode.

FIG. 5 is a conceptual diagram illustrating an example of an angular intra prediction mode. Given a specific intra prediction direction, for each sample of the predictor block, its coordinate (x, y) is first projected to the row/column of neighboring reconstructed samples along the prediction direction, as shown in an example in FIG. 5. Suppose (x,y) is projected to the fractional position a between two neighboring reconstructed samples L and R; then the prediction value for (x, y) may be calculated using a two-tap bi-linear interpolation filter, formulated as follows:

$$p_{xy}=(1-\alpha)\cdot L+\alpha\cdot R.$$

For instance, as shown in the example of FIG. 5, coordinates (x,y) of a sample 70 of a predictor block 72 are projected along a specific intra prediction direction 74. To avoid floating point operations, in HEVC, the above calculation is actually approximated using integer arithmetic as:

$$p_{xy}=((32-a)\cdot L+a\cdot R+16)>>5,$$

where a is an integer equal to 32*α.

In some examples, before intra prediction, the neighboring reference samples are filtered using a 2-Tap bilinear or 3-Tap (1,2,1)/4 filter, as known as intra reference smoothing, or mode-dependent intra smoothing (MDIS). When doing intra prediction, given the intra prediction mode index (predModeIntra) and block size (nTbS), it is decided whether an reference smoothing process is performed and which smooth filter is used. The intra prediction mode index is an index indicating an intra prediction mode. The text below from the HEVC standard describes a filtering process of the neighboring samples.

8.4.4.2.3 Filtering Process of Neighbouring Samples

Inputs to this process are:
  the neighbouring samples p[x][y], with x=−1, y=−1 . . . nTbS*2−1 and x=0 . . . nTbS*2−1, y=−1,
  a variable nTbS specifying the prediction block size.

Outputs of this process are the filtered samples pF[x][y], with x=−1, y=−1 . . . nTbS*2−1 and x=0 . . . nTbS*2−1, y=−1.

The variable filterFlag is derived as follows:
  If one or more of the following conditions are true, filterFlag is set equal to 0:
    predModeIntra is equal to INTRA_DC.
    nTbS is equal 4.
  Otherwise, the following applies:
    The variable minDistVerHor is set equal to
      Min(Abs(predModeIntra−26),Abs(predModeIntra−10)).
    The variable intraHorVerDistThres[nTbS] is specified in Table 8-3.
    The variable filterFlag is derived as follows:
      If minDistVerHor is greater than intraHorVerDistThres[nTbS], filterFlag is set equal to 1.
      Otherwise, filterFlag is set equal to 0.

TABLE 8-3

Specification of intraHorVerDistThres[nTbS] for various prediction block sizes

|  | nTbS = 8 | nTbS = 16 | nTbS = 32 |
|---|---|---|---|
| intraHorVerDistThres[nTbS] | 7 | 1 | 0 |

When filterFlag is equal to 1, the following applies:
  The variable biIntFlag is derived as follows:
  If all of the following conditions are true, biIntFlag is set equal to 1:
    strong_intra_smoothing_enabled_flag is equal to 1
    nTbS is equal to 32

$\text{Abs}(p[-1][-1]+p[nTbS*2-1][-1]-2*p[nTbS-1][-1])$
$<(1<<(\text{BitDepth}_Y-5))$ $\text{Abs}(p[-1][-1]+p[-1][nTbS*2-1]-2*p[-1][nTbS-1])$
$<(1<<(\text{BitDepth}_Y-5))$ Otherwise, biIntFlag is set equal to 0.
The filtering is performed as follows:
If biIntFlag is equal to 1, the filtered sample values pF[x][y] with x=−1, y=−1 . . . 63 and x=0 . . . 63, y=−1 are derived as follows:

$pF[-1][-1]=p[-1][-1]$ (8-30)

$pF[-1][y]=((63-y)*p[-1][-1]+(y+1)*p[-1][63]+32)$
$>>6 \text{ for } y=0 \ldots 62$ (8-31)

$pF[-1][63]=p[-1][63]$ (8-32)

$pF[x][-1]=((63-x)*p[-1][-1]+(x+1)*p[63][-1]+32)$
$>>6 \text{ for } x=0 \ldots 62$ (8-33)

$pF[63][-1]=p[63][-1]$ (8-34)

Otherwise (biIntFlag is equal to 0), the filtered sample values pF[x][y] with x=−1, y=−1 . . . nTbS*2−1 and x=0 . . . nTbS*2−1, y=−1 are derived as follows:

$pF[-1][-1]=(p[-1][0]+2*p[-1][-1]+p[0][-1]+2)>>2$ (8-35)

$pF[-1][y]=(p[-1][y+1]+2*p[-1][y]+p[-1][y-1]+2)$
$>>2 \text{ for } y=0 \ldots nTbS*2-2$ (8-36)

$pF[-1][nTbS*2-1]=p[-1][nTbS*2-1]$ (8-37)

$pF[x][-1]=(p[x-1][-1]+2*p[x][-1]+p[x+1][-1]+2)$
$>>2 \text{ for } x=0 \ldots nTbS*2-2$ (8-38)

$pF[nTbS*2-1][-1]=p[nTbS*2-1][-1]$ (8-39)

Panusopone et al., "Unequal Weight Planar Prediction and Constrained PDPC," Joint Video Exploration Team (JVET) of ITU-T SG 16 WP 3 and ISO/IEC JTC 1/SC 29WG 11, 5$^{th}$ Meeting, Geneva, CH, 12-20 Jan. 2017, document JVET-E0068, described an unequal weight planar (UWP) mode. In the UWP mode, for a W×H (width×height) block, the planar prediction is performed in the manner of FIG. 4 with:

$p_{xy}=((y1*H*(W-x1))\cdot L+(x1*W*(H-y1))\cdot T+(x1*y1*H)$
$\cdot R+(x1*y1*W)\cdot B)/(W*H*(x1+y1))$ where R and B are calculated as shown below, $R=(TR*(H-y1)+BR*y1)/H;$ $B=(BL*(W-x1)+BR*(k+1))/W$ where BR is calculated as shown below, $BR=(H*TR+W*BL)/(W+H);$ and where $p_{xy}$ is a value of the predicted sample.

Although the cross-complement redundancy is significantly reduced in the YCbCr color space, correlation between the three-color components still exists. Various techniques have been studied to improve video coding performance by further reducing the correlation between the three color components. For example, in 4:2:0 chroma video coding, a technique called Linear Model (LM) prediction mode was studied during development of the HEVC standard. In 4:2:0 sampling, each of the two chroma arrays has half the height and half the width of the luma array. With the LM prediction mode, chroma samples are predicted based on reconstructed luma samples of the same block by using a linear model as follows:

$$\text{pred}_c(i,j)=\alpha*\text{rec}_L(i,j)+\beta \quad (1)$$

where $\text{pred}_C(i, j)$ represents a prediction of chroma samples in a current block and $\text{rec}_L(i, j)$ represents a down-sampled reconstructed luma samples of the current block. Parameters α and β are derived from causal reconstructed samples around the current block. Causal samples of a block are samples that occur prior to the block in a decoding order. If the chroma block size is denoted by N×N, then both i and j are within the range [0, N).

Parameters α and β in equation (5) are derived by minimizing regression error between the neighboring reconstructed luma and chroma samples around the current block.

$$E(\alpha, \beta) = \sum_i (y_i - (\alpha \cdot x_i + \beta))^2 \quad (2)$$

The parameters α and β are solved as follows:

$$\alpha = \frac{I\sum x_i \cdot y_i - \sum x_i \cdot \sum y_i}{I\sum x_i \cdot x_i - \sum x_i \cdot \sum x_i} \quad (3)$$

$$\beta = \left(\sum y_i - \alpha \cdot \sum x_i\right)/I \quad (4)$$

In the equations above, $x_i$ is a down-sampled reconstructed luma reference sample where the color format is not 4:4:4 (i.e., the color format is one in which one chroma sample corresponds to multiple luma samples), $y_i$ is reconstructed chroma reference samples without down-sampling, and I is the number of reference samples. In other words, the video coder may down-sample the reconstructed luma reference samples based on the color format not being 4:4:4, but refrain from down-sampling the reconstructed luma reference samples based on the color format being 4:4:4. For a target N×N chroma block, when both left and above causal samples are available, the total number of involved samples I is equal to 2N. When only left or above causal samples are available, the total number of involved samples I is equal to N. Here, N is always equal to $2^m$ (wherein m may be different for different CU sizes). Therefore, to reduce the complexity, shifting operations can be used to implement the division operations in equations (3) and (4). A reference sample may be considered to be unavailable when a true value of the reference sample is unavailable for use by a video decoder (e.g., when the reference sample is outside a slice, picture, or tile boundary with respect to the prediction block).

U.S. Patent Pub. No. 2017-0094285-A1 describes a set of parameterized equations defining how to combine predictions based on filtered and unfiltered reference values, and on the position of the predicted pixel. This scheme is called position-dependent prediction combination (PDPC), and has been adopted in JEM 7. A. Said et al, "Position-dependent intra prediction combination," Geneva, Switzerland, ITU-T SG16, COM16-C1046 contribution, October 2015, is a standard submission document regarding the adopted subject matter. In JEM 7, PDPC is applied in Planar mode only.

Figure 6A:
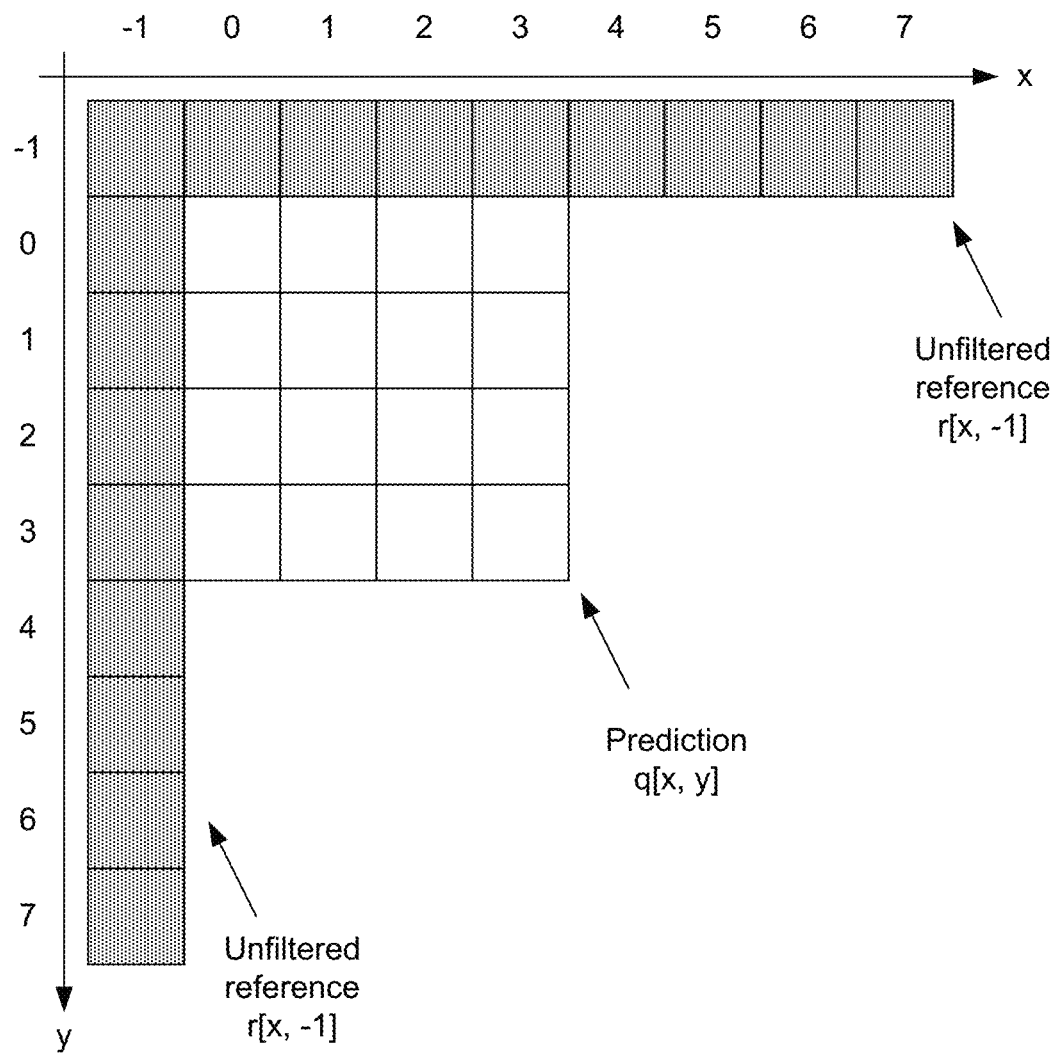
FIG. 6A is a conceptual diagram illustrating an example of data available for position-dependent prediction combination for a 4×4 pixel block.
Figure 6B:
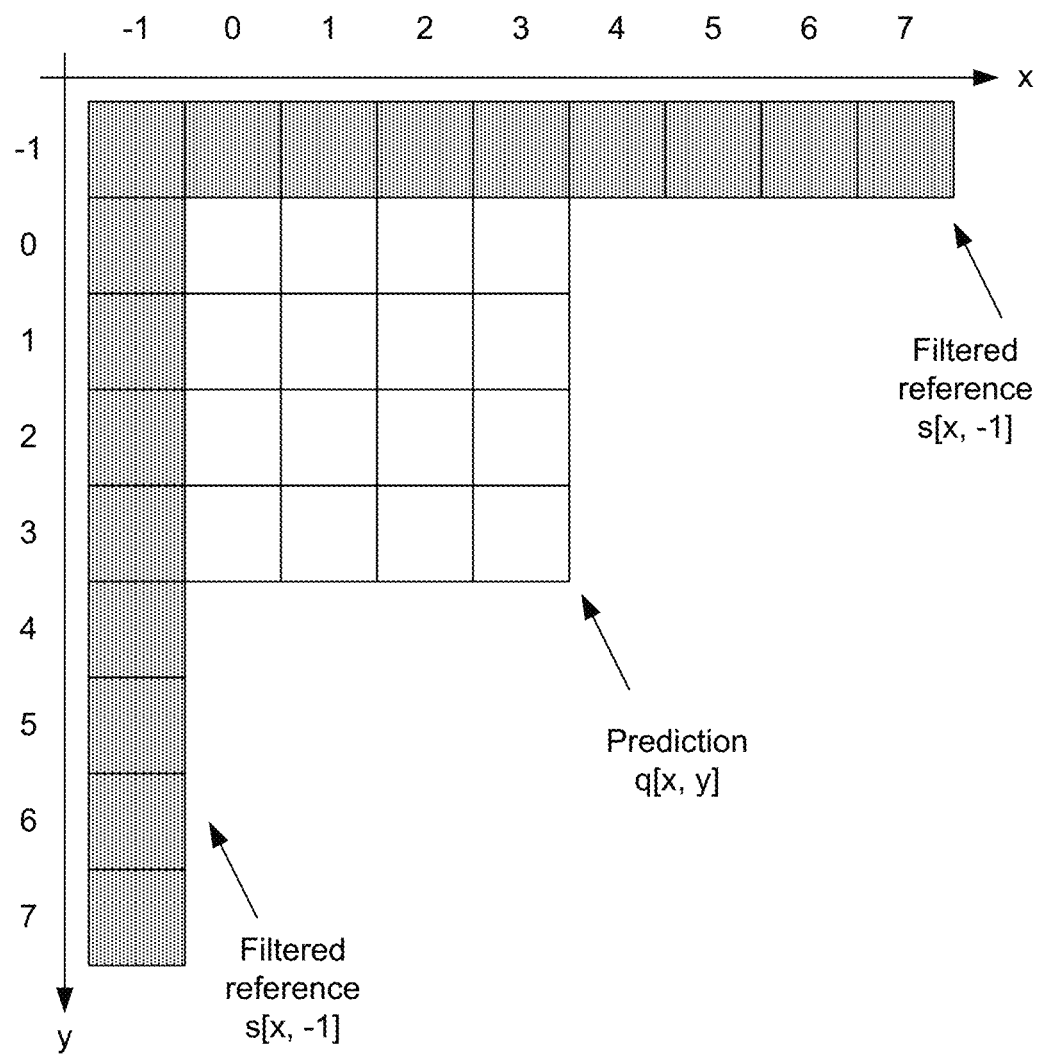
FIG. 6B is a conceptual diagram illustrating an example of data available for position-dependent prediction combination for a 4×4 pixel block.

FIG. 6A is a conceptual diagram illustrating an example of data available for PDPC for a 4×4 pixel block. FIG. 6B is a conceptual diagram illustrating an example of data available for PDPC for a 4×4 pixel block. With PDPC, given any two sets of pixel predictions $p_r[x, y]$ and $q_s[x, y]$, computed using only the unfiltered and filtered (or smoothed) references r and s, respectively, the combined predicted value of a pixel, denoted by v[x, y], is defined by:

$$v[x,y]=c[x,y]p_r[x,y]+(1-c[x,y])q_s[x,y] \quad (5)$$

where c[x, y] is the set of combination parameters, of which the value depends on a pixel position. In FIG. 6A and FIG. 6B, references (i.e., reference samples) are shown as shaded squares and prediction samples are shown as white squares.

One practical implementation of PDPC uses the formula:

$$v[x, y] = \left\lfloor \frac{c_1^{(v)} r[x, -1] - c_2^{(v)} r[-1, -1]}{2^{\lfloor y/d_v \rfloor}} \right\rfloor + \left\lfloor \frac{c_1^{(h)} r[-1, y] - c_2^{(h)} r[-1, -1]}{2^{\lfloor x/d_h \rfloor}} \right\rfloor + [x, y] q_s^{(HEVC)}[x, y] \quad (6)$$

where $c_1^v$, $c_2^v$, $c_1^h$, $c_2^h$, g, and $d_v$, $d_h \in \{1,2\}$, are pre-defined parameters controlling how fast the weights for left, top-left and top unfiltered reference sample are decaying along the horizontal and vertical direction, N is the block size, $q_s^{(HEVC)}[x,y]$ is prediction values computed according to the HEVC standard, for the specific mode, using filtered references, and:

$$b[x, y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor \quad (7)$$

is a normalization factor, defined by the parameters. Reference filters, e.g., 3-tap {1,2,1}, 5-Tap {1,4,6,4,1} or 7-tap {1,6,15,20,15,6,1}, are applied on unfiltered references to generate the filtered references. In this disclosure, the notation $\{t_1, t_2, \ldots t_c, \ldots, t_n\}$ for taps of a filter indicates that a filtered value of a current sample in a set of samples is equal to a weighted sum of samples before and after the current sample, where the weight applied to the current sample is the center weight in $\{t_1, t_2, \ldots t_c, \ldots, t_n\}$ (i.e., $t_c$) and weights $t_1 \ldots t_{c-1}$ are weights applied to samples before the current sample and $t_{c+1} \ldots t_n$ are weights applied to samples after the current sample. In some examples, low-pass filters can be used as reference filters. A typical low-pass filter can only have positive filter coefficients, or negative filter coefficients can be present but the absolute value is relatively small or close to zero.

Alternatively, PDPC can be formulated as a 4-tap filter as below:

$$v[x, y] = wT \cdot r[x, -1] + wL \cdot r[-1, y] - wTL \cdot r[-1, -1] + (1 - wT - wL + wTL) q_s^{(HEVC)}[x, y] \quad (8)$$

where $$wT = \frac{c_1^{(v)}}{2^{\lfloor y/d_v \rfloor}}, \; wL = \frac{c_1^{(h)}}{2^{\lfloor x/d_h \rfloor}}, \; wTL = \frac{c_2^{(v)}}{2^{\lfloor y/d_v \rfloor}} + \frac{c_2^{(h)}}{2^{\lfloor x/d_h \rfloor}}$$

are the weightings applied on the top, left, top-left unfiltered reference samples.

There are several shortcomings in the JEM related to the PDPC mode. For example, in JEM 7, PDPC is applied to planar mode only, which limits the coding gain contributed by PDPC. In JEM 7, there is a boundary filter applied to DC mode, and an edge filter applied to horizontal and vertical modes. The boundary filter applied in DC mode is a filter for the predictor across block boundaries on the left and above. Horizontal/Vertical edge filter is a filter compensating the difference between the horizontal and vertical reference pixel and top left corner pixel. These coding tools refine the intra prediction in a way that overlaps with PDPC in terms of algorithm design. Existence of several coding tools that overlap with each other is not desired in terms of a clean and harmonized design of intra prediction. The parameters in PDPC are derived based on training, which may be sub-optimal in terms of coding gain for different sequences. The UWP mode requires division operations, which are not preferred for practical implementation. Although UWP can be alternatively approximated by using a look-up table (LUT) to avoid divisions, this requires additional memory to store the LUT. To resolve the problems mentioned above, this disclosure proposes the following techniques.

Figure 7A:
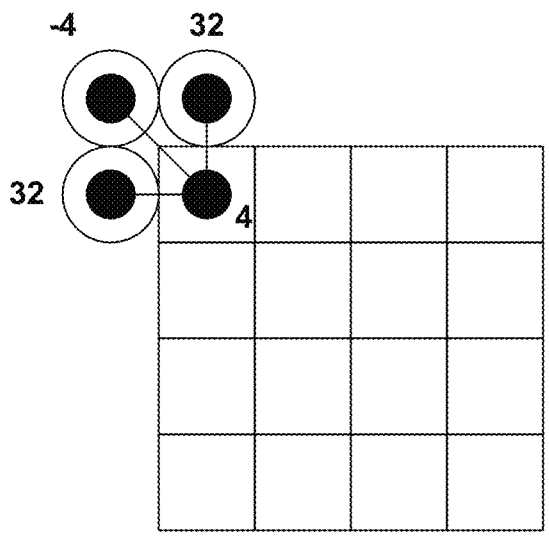
FIG. 7A is a block diagram illustrating an example using a planar/DC mode with a weighting applied for generating a prediction sample (0, 0), in accordance with a technique of this disclosure.
Figure 7B:
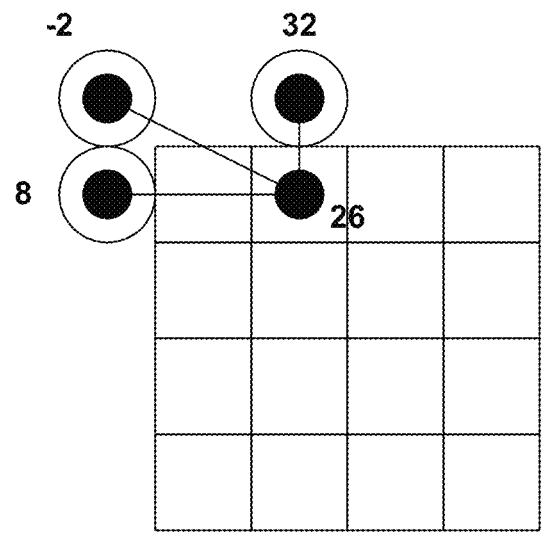
FIG. 7B is a block diagram illustrating an example using a planar/DC mode with a weighting applied for generating a prediction sample (1, 0), in accordance with a technique of this disclosure.
Figure 7C:
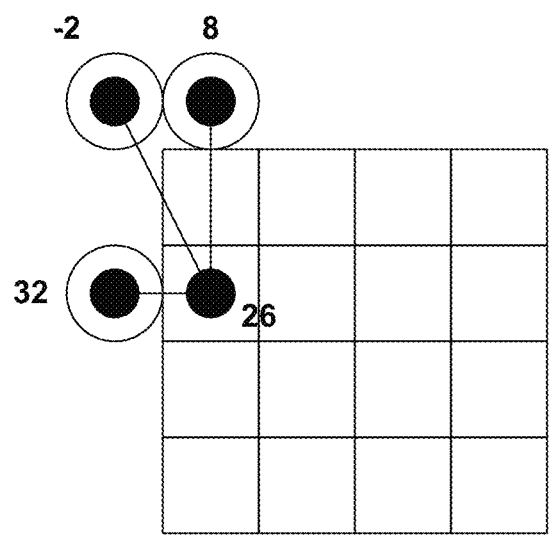
FIG. 7C is a block diagram illustrating an example using a planar/DC mode with a weighting applied for generating a prediction sample (0, 1), in accordance with a technique of this disclosure.
Figure 7D:
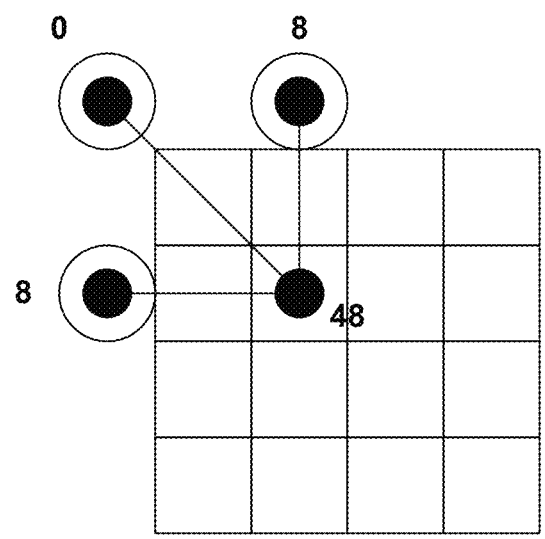
FIG. 7D is a block diagram illustrating an example using a planar/DC mode with a weighting applied for generating a prediction sample (1, 1), in accordance with a technique of this disclosure.

This disclosure describes simplified PDPC techniques that may address one or more of the shortcomings described above. FIG. 7A is a block diagram illustrating an example of using a planar/DC mode with a weighting applied for generating a prediction sample (0, 0), in accordance with a technique of this disclosure. FIG. 7B is a block diagram illustrating an example using a planar/DC mode with a weighting applied for generating a prediction sample (1, 0), in accordance with a technique of this disclosure. FIG. 7C is a block diagram illustrating an example using a planar/DC mode with a weighting applied for generating a prediction sample (0, 1), in accordance with a technique of this disclosure. FIG. 7D is a block diagram illustrating an example using a planar/DC mode with a weighting applied for generating a prediction sample (1, 1), in accordance with a technique of this disclosure. The simplified PDPC techniques disclosed herein are applied for both luminance (Y) and chrominance (Cb, Cr) components, only luminance components, or only chrominance components.

In accordance with a technique of this disclosure, a video coder may calculate a prediction sample at coordinates (x, y) as follows using equation (9), below.

$$v[x, y] = (wT \cdot r[x, -1] + wL \cdot r[-1, y] + wTL \cdot r[-1, -1] + (1 - wT - wL - wTL) q_s^{(HEVC)}[x, y] + \text{offset}) >> \text{rightShift} \quad (9)$$

In equation (9) and elsewhere in this disclosure, example values of offset and rightShift may include offset=32 and rightShift=6. In Equation (9), $q_s^{(HEVC)}[x, y]$ denotes a value of a prediction sample at coordinates (x, y) determined according to the intra prediction process specified by HEVC. In some examples, offset may be equal to 0, 0.5, or another value.

In another example, the video coder may calculate a value of a prediction sample at coordinates (x, y) according to equation (10), below.

$$(wT \cdot r[x, -1] + wL \cdot r[-1, y] + wTL \cdot r[-1, -1] +$$
$$(1 - wT - wL - wTL)q_s[x, y] + \text{offset}) >> \text{rightShift} \quad (10)$$

In equation (10), $q_s[x, y]$ denotes a value of a prediction sample at coordinates (x, y) determined according to an intra prediction process, which may be the intra prediction process specified by HEVC or another intra prediction process.

In another example, the video coder may calculate a value of a prediction sample at coordinates (x, y) according to equation (11), below.

$$(wT \cdot r[x, -1] + wL \cdot r[-1, y] + wTL \cdot r[-1, -1] +$$
$$(2^{rightShift} - wT - wL - wTL)q_s[x, y] + \text{offset}) >> \text{rightShift} \quad (11)$$

Equation (11) shows an example relationship between rightShift and the value from which wT, wL, and wTL are subtracted to determine the fourth weight. The equations used in the sections entitled "Specification of intra prediction mode INTRA_PLANAR," "Specification of intra prediction mode INTRA_DC," "Specification of intra prediction mode INTRA_HOR," and "Specification of intra prediction mode INTRA_VER" below use a version of equation (11) where rightShift is equal to 6, and consequently the value from which wT, wL, and wTL are subtracted to determine the fourth weight is equal to 64.

To avoid a LUT table for the weights as occurred in the original PDPC design, in the simplified version, a video coder implemented in accordance with the techniques of this disclosure may select the initial weights wL, wT for left and top reference samples (e.g., 32, 32 as shown in FIG. 7A), derive the weight wTL for the top-left reference samples as −(wL>>4)−(wT>>4) (e.g., −4 as shown in FIG. 7A), and then calculate the PDPC prediction for the first sample in the block by applying equation (9), (10), or (11).

Moving to the next sample in the block, the initial values of weights wL, wT, wTL are updated based on the distance between the current sample and the block boundaries. For example, the update can be just a shift operation, such as ">>1" or ">>2", i.e., a weight is divided by 2 or 4 (e.g., moving from (0, 0) to (1, 0) as shown in FIG. 7A and FIG. 7B, wL is divided by 4). Moving to the next sample in the block, the weights are updated again and so on. In such an approach, there is no need to have a LUT with weights, since all the weights are derived from the initial weights.

Thus, in accordance with a technique of this disclosure, the video coder (e.g., video encoder 20 or video decoder 30) may determine an initial value of a first weight (wL) and may determine an initial value of a second weight (wT). Furthermore, for each respective sample in a set of samples in the predictor block, the video coder may determine, based on the initial value of the first weight and a distance between the respective sample and a first boundary of the predictor block, a value of the first weight for the respective sample. The video coder may also determine, based on the initial value of the second weight and a distance between the respective sample and a second boundary of the predictor block, a value of the second weight for the respective sample. Furthermore, the video coder may determine a value of a third weight (wTL) for the respective sample. The video coder may also determine a value of a fourth weight for the respective sample based on the value of the first weight for the respective sample, the value of the second weight for the respective sample, and the value of the third weight for the respective sample. For instance, the video coder may determine the value of the fourth weight for the respective sample as (64−wL−wT−wTL) or in accordance with any of the other examples provided in this disclosure. Additionally, the video coder may determine a primary value ($q_s[x, y]$) for the respective sample according to the intra prediction mode. Next, the video coder may determine a secondary value for the respective sample as a first value for the respective sample right-shifted by a second value, the first value for the respective sample being a sum of:

(i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by an above-left reference sample for the respective sample that is above and left of the respective sample, (iv) the value of the fourth weight for the respective sample multiplied by the primary value for the respective sample, and (v) an offset value.

In some examples, each of the values of the first, second, third, and fourth weights is a non-zero value.

In some examples, the update of wL, wT and wTL may not happen after deriving a PDPC prediction for each sample. That is, in some examples, the video coder does not determine different values of the first, second, and third weights for each separate sample of the predictor block. For example, the update may happen after N processed samples (e.g., when N=2, the update happens after every second sample). In another example, the video coder updates wL every other sample along the horizontal direction and wT is updated every other sample along the vertical direction. Additionally, all involved weights (e.g., the first, second, third, and fourth weights) may have different update processes and distance dependencies. For example, the video coder may update the first, second, third, and fourth weights after processing different numbers of samples; and the amount by which the video coder changes the first, second, third, and fourth weights according to distance from boundaries of the predictor block may differ.

In some examples, how the update is performed and after how many samples, may depend on the block size, intra mode, transform used, and so on. For example, the video coder may update a weight (e.g., the first, second, third, and/or fourth weight) after processing each sample of a predictor block if a size of the predictor block is less than a threshold size of W×L (e.g., 32×32, 16×16, etc.) and may update the weight after processing two samples of the predictor block if the size of the predictor block is greater than the threshold size of W×L. In another example, the video coder may update a weight (e.g., the first, second, third, and/or fourth weight) after processing each sample of a predictor block if the intra prediction mode of the predictor block is a directional intra prediction mode and may update the weight after processing two samples of the predictor block if the intra prediction mode of the predictor block is the Planar or DC mode.

In one implementation example, a dual implementation of the simplified PDPC techniques of this disclosure may be possible and both implementations may provide the identical results. In one implementation, the simplified PDPC techniques of this disclosure can be considered as a second stage after the conventional intra prediction is derived. That is, the simplified PDPC techniques of this disclosure can be seen as a prediction post processing. Such an approach may provide a uniform implementation for all intra modes, but may require an additional stage in the intra prediction. In another implementation, the simplified PDPC techniques of this disclosure may be implemented as a modified intra prediction mode, i.e., another intra prediction mode different from conventional intra prediction. In such an approach, the modification can be intra prediction mode specific, but it may not require an additional stage in the intra prediction. The simplified PDPC techniques of this disclosure may have this duality in the implementation, which may provide an additional advantage and an implementer may choose whichever approach most fits the codec design.

For intra prediction, for each intra prediction sample (e.g., for each respective sample of the predictor block or a subset thereof), after the intra prediction sample is generated (i.e., after a primary value for the respective sample is determined), the prediction sample value may be further adjusted by a weighted sum of a left reference sample, a top reference sample, a top-left reference sample, and its original prediction sample value (i.e., the primary value for the respective sample). The weighting of the left reference sample is denoted wL, the weighting of the top reference sample is denoted wT, and the weighting of the top-left reference sample is denoted wTL. In some examples, a video coder may derive wTL by a weighted sum of wL and wT (e.g., $wTL=a \cdot wL+b \cdot wT$). Thus, in some such examples, the video coder may determine a value of the third weight (wTL) for a sample of the predictor block as a sum of a first parameter (a) multiplied by the value of the first weight (wL) for the respective sample plus a second parameter (b) multiplied by the value of the second weight (wT) for the respective sample. In some examples, wL and wT are initialized as 0.5. In some examples, each of the first parameter and the second parameter is between 0 and 1, exclusive.

The values of the first parameter (a) and the second parameter (b) may be determined in one or more of various ways. For example, the values of a and b may be mode-dependent. For instance, in an example where the values of a and b are mode dependent, the values of a and b may be dependent on different intra prediction directions. Thus, in this example, different values of a and b can be applied for different intra prediction directions. For example, for non-directional intra prediction modes (e.g., planar mode and DC mode), the first parameter (a) is equal to the second parameter (b) (i.e., a=b). In another example where the values of a and b are mode dependent, a look-up table is pre-defined, input to the look-up table is the intra prediction mode index, and output of the look-up table is the values of a and b. In some examples, if vertical prediction is used, then more preference can be given to b, i.e. b>a. Similar, for horizontal prediction, a may be greater than b.

Furthermore, in other examples where the values of a and b are mode-dependent, for directional intra prediction modes (e.g., horizontal and vertical), the first parameter (a) and the second parameter (b) are derived based on the intra prediction angle difference or the intra mode index difference relative to horizontal and vertical prediction direction. For instance, in one example, for horizontal prediction, a is equal to 0 and b is equal to 1; for vertical prediction, a is equal to 1 and b is equal to 0. In this example, for vertical-like prediction angles, the angle difference relative to vertical prediction is measured to calculate a and b. Furthermore, in this example, for horizontal-like prediction angles, the angle difference relative to horizontal prediction is measured to calculate a and b.

In another example of how the values of the first parameter (a) and the second parameter (b) may be determined, a and b are two constant values regardless of the position inside the predictor block. In this example, typical values of a and b includes: $\frac{1}{16}$, $\frac{1}{32}$, $\frac{1}{8}$, $\frac{1}{4}$, $\frac{1}{2}$, 1 and 0. In another example, a and b are signaled from video encoder 20 to video decoder 30 at a sequence level, a picture level, a slice level, a block level, or another level.

In some examples, a video coder may derive the value of the first weight (wT) based on a scaled vertical coordinate y of the prediction sample, a block size, and an intra prediction mode. For example, y can be divided by 2, 4, or 8 to derive the value of the first weight (wT). How weight is changed can depend on the block size (e.g., the divisor of the coordinate). For small blocks, the decay of the weight can be faster than for the larger blocks. The video coder may derive the value of the second weight (wL) based on a scaled horizontal coordinate x of the prediction sample, the block size and the intra prediction mode. In this example, the block size may refer to one of:

min(log 2(width), log 2(height)),
max(log 2(width), log 2(height)),
(log 2(width)+log 2(height))/2,
log 2(width)+log 2(height),
log 2(width), or
log 2(height).

In this example, for non-directional intra prediction modes like Planar and DC modes, for the same coordinate (x, y), the same values of wT and wL may be used. In other words, in this example, wT=wL=m for each prediction sample of the predictor block, but there may be different values of m for different prediction samples of the predictor block. Furthermore, the scaling on the vertical and horizontal coordinate x and y may be pre-defined. In some examples, typical values of the scaling value include 2, 4 and 8.

In one example, the techniques disclosed here (above weightings of left, top and top-left reference samples) are applied for Planar mode, DC mode, horizontal mode and vertical mode.

In some examples, the video coder may apply the simplified PDPC techniques of this disclosure only when particular conditions apply. For instance, when the conditions do not apply, the video coder may determine secondary values of samples in a predictor block using conventional intra prediction. In one example, the video coder may apply the simplified PDPC techniques of this disclosure for LM mode or enhanced LM mode (Chroma component) as described in Zhang et al., "Enhanced Cross-Component Linear Model Intra-prediction," Joint Video Exploration Team (WET) of ITU-T SG 16 WP 3 and ISO/IEC JTC 1/SC 29/WG 11, $4^{th}$ Meeting, Chengdu, CN, 15-21 Oct. 2016, document no. WET-D0110. In this example, the video coder does not apply the simplified PDPC techniques of this disclosure for a predictor block of a CU when LM mode or enhanced LM mode is not applied in the CU. In some examples, the simplified PDPC techniques of this disclosure are applied for certain block sizes, e.g., for block area size greater than a threshold (e.g., prediction blocks larger (or smaller) than 8×8, 16×16, 32×32, 16×8, etc.). In some examples, the simplified PDPC techniques of this disclosure are applied for certain types of pictures or slices. For instance, in one example, the video coder only applies the simplified PDPC techniques of this disclosure in I-slices. Furthermore, in some examples, the simplified PDPC techniques of this disclosure are not applied when some neighboring samples are unavailable. For instance, in one example, the video coder does not apply the simplified PDPC techniques of this disclosure if the top neighboring samples are unavailable.

Furthermore, in another example, the simplified PDPC techniques of this disclosure are only applied to selected prediction sample positions within a prediction block rather than applying to the entire prediction block. In some examples, the selected prediction sample positions are at a pre-defined number of columns starting from the left and/or a pre-defined number of rows starting from top. For instance, a video coder may apply the simplified PDPC techniques of this disclosure to even-numbered rows or columns of the prediction block, but not odd-numbered rows or columns of the prediction block. In some examples, the number of columns/rows of prediction samples to which the simplified PDPC techniques of this disclosure are applied may depend on coded information, including, but not limited to block size, block height and/or width, and/or intra prediction mode. For example, the video coder may apply the simplified PDPC techniques of this disclosure to each row of the prediction block if the size of the prediction block is less than a threshold size (e.g., 16×16, 8×8, etc.) and may apply the simplified PDPC techniques of this disclosure to every other row/column of the prediction block if the size of the prediction block is greater than or equal to the threshold size.

The clipping operations on the prediction samples after the weighting operations can be removed. Clipping may be used to guarantee the predictor value is within the certain range, usually related to input bit depth. If after deriving the predictor, the pixel is exceeding the range, the video coder may clip its value to minimum or maximum range value. However, in accordance with the techniques of this disclosure, such clipping operations on prediction samples may be unnecessary.

The left, top and top-left reference samples used to adjust the prediction sample may be filtered/smoothed reference samples or unfiltered reference samples, and the selection depends on intra prediction mode. In one example, for the DC, Horizontal and Vertical intra prediction directions, a video coder may use the unfiltered top, left and top-left reference samples in the weighted sum calculation; for Planar mode the filtered/smoothed left, top and top-left reference samples are used in the calculation.

As described above, in earlier versions of PDPC, a video coder may apply 5-tap or 7-tap filters to reference samples. However, in accordance with some examples of this disclosure, instead of applying a longer tap filter (e.g., a 5-tap or a 7-tap filter) to the reference samples, the video coder may apply only a short-tap filter (e.g., a 3-tap filter) and the longer tap filter may be replaced by cascading multiple short-tap filters in a pre-defined order. This disclosure may use the phrase "smoothed reference samples" to refer to the samples resulting from applying a filter, or cascade of filters, to a set of reference samples. Different sets of smoothed reference samples may be applied in intra prediction, e.g., PDPC. In other words, the video coder may generate different sets of smoothed reference samples when performing the simplified PDPC techniques of this disclosure. In some examples, the video coder may generate the different sets of smoothed reference samples by applying different cascades of short-tap filters. Different cascades of short-tap filters may have different numbers of short-tap filters and/or different orders of cascading short-tap filters. The video coder may select a set of smoothed reference samples in performing the simplified PDPC techniques of this disclosure. The selection of which set of smoothed reference samples may depend on the block size, e.g., block area size, block height and/or width, and/or intra prediction mode. For example, the video coder may select a first set of smoothed reference samples (e.g., a set of reference samples generated with a first filter or set of filters) when a size of the prediction block is less than a threshold size (e.g., 16×16, 8×8, etc.) and may select a second set of smoothed reference samples when the size of the prediction block is greater than or equal to the threshold size.

In one example where the video coder applies a cascade of short-tap filters to the reference samples, the cascade of short-tap filters includes a 3-tap $\{2, 4, 2\}$ filter and a 3-tap $\{4, 0, 4\}$ filter. In this example, the video coder generates a first set of smoothed reference samples using the 3-tap $\{2, 4, 2\}$ filter and generates a second set of smoothed reference samples by further applying the 3-tap $\{4, 0, 4\}$ filter on top of the first set of smoothed reference samples. In other words, the video coder may generate the second set of smoothed reference samples by cascading the filtering using the 3-tap $\{2, 4, 2\}$ filter and the 3-tap $\{4, 0, 4\}$ filter. In another example, the two short-tap filters include a $\{2, 4, 2\}$ filter and a $\{3, 2, 3\}$ filter, and the same process described above may apply. In another example, instead of cascading two 3-tap filters, the video coder may directly apply a 5-tap $\{1, 2, 2, 2, 1\}$ filter to the reference samples.

In some examples, the video coder applies the reference sample filtering with any of intra prediction modes. In other examples, the video coder applies the reference sample filtering for some intra prediction modes, but not others. For instance, in one example, when applying the simplified PDPC techniques of this disclosure, the video coder only applies reference sample filtering on Planar intra prediction mode, not on the DC, horizontal, or vertical intra prediction modes.

In some examples, the video coder may apply different filters (e.g., different numbers of filter taps) for the reference samples, and the selection of the filters may depend on the reference sample location. For instance, in one example, the video coder may apply different filters to a reference sample depending on whether the reference sample is located at a boundary position (bottom-left, top-right, top-left) of all available reference samples or not. In some examples, which set of filters is applied is signaled by video encoder 20 to video decoder 30. In such examples, video encoder 20 may signal the set of filters in various places within the bitstream, such as at a sequence level, a picture level, a slice level or a block level.

In the original PDPC design, unfiltered and filtered versions of the reference samples are used in the prediction derivation. However, there may be another smoothing filter used for intra reference smoothing, such as mode dependent intra smoothing (MDIS) used in HEVC. To further unify the prediction process, the PDPC filters such as the 3/5-tap filter used to generate the filtered version (filter length may depend on the block size and/or intra direction) may be replaced in the simplified PDPC techniques of this disclosure to use exactly the same smoothing filtering (MDIS, for example) which may be applied for the modes not using PDPC. In this way, there may be no need to retain a PDPC-specific filtering process and implementation of PDPC can be further simplified.

The following part of this disclosure describes example codec specification text to implement example techniques of this disclosure. Some operations reflecting techniques of this disclosure are emphasized with "<highlight> . . . </highlight>" tags.

The following section of codec specification text entitled "Filtering process of neighboring samples" describes a filtering process for neighboring reference samples used for intra prediction.

Filtering Process of Neighboring Samples

Inputs to this process are:
  the neighbouring samples p[x][y], with x=−1, y=−1 . . . nTbS*2−1 and x=0 . . . nTbS*2−1, y=−1,
  a variable nTbWidth and nTbHeight specifying the transform block width and height.
  a 3-tap filter f[3].

Outputs of this process are the filtered samples pF[x][y], with x=−1, y=−1 . . . (nTbWidth+nTbHeight)−1 and x=0 . . . (nTbWidth+nTbHeight)−1, y=−1.

The variable filterFlag is derived as follows:
  If one or more of the following conditions are true, filterFlag is set equal to 0:
    predModeIntra is equal to INTRA_DC.
    nTbS is equal 4.
  Otherwise, the following applies:
    The variable minDistVerHor is set equal to
      Min(Abs(predModeIntra−26),Abs(predModeIntra−10)).
    The variable intraHorVerDistThres[nTbS] is specified in Table 8-3.
    The variable filterFlag is derived as follows:
      If minDistVerHor is greater than intraHorVerDistThres[nTbWidth], filterFlag is set equal to 1.
      Otherwise, filterFlag is set equal to 0.

TABLE 8-3

Specification of intraHorVerDistThres[nTbWidth] for various prediction block sizes

|  | nTbWidth = 8 | nTbWidth = 16 | nTbWidth = 32 |
|---|---|---|---|
| intraHorVerDistThres[nTbS] | 7 | 1 | 0 |

When filterFlag is equal to 1, the following applies:
  The variable biIntFlag is derived as follows:
    If all of the following conditions are true, biIntFlag is set equal to 1:
      strong_intra_smoothing_enabled_flag is equal to 1
      nTbWidth is equal to 32
      Abs($p$[−1][−1]+$p$[nTbWidth+nTbHeight−1][−1]−2*$p$[nTbWidth−1][−1])<(1<<(BitDepth$_Y$−5))
      Abs($p$[−1][−1]+$p$[−1][nTbWidth+nTbHeight−1]−2*$p$[−1][nTbWidth−1])<(1<<(BitDepth$_Y$−5))
    Otherwise, biIntFlag is set equal to 0.
  The filtering is performed as follows:
    If biIntFlag is equal to 1, the filtered sample values pF[x][y] with x=−1, y=−1 . . . 63 and x=0 . . . 63, y=−1 are derived as follows:

$$pF[-1][-1]=p[-1][-1] \quad (8\text{-}30)$$

$$pF[-1][y]=((63-y)*p[-1][-1]+(y+1)*p[-1][63]+32)>>6 \text{ for } y=0 \ldots 62 \quad (8\text{-}31)$$

$$pF[-1][63]=p[-1][63] \quad (8\text{-}32)$$

$$pF[x][-1]=((63-x)*p[-1][-1]+(x+1)*p[63][-1]+32)>>6 \text{ for } x=0 \ldots 62 \quad (8\text{-}33)$$

$$pF[63][-1]=p[63][-1] \quad (8\text{-}34)$$

Otherwise (biIntFlag is equal to 0), the filtered sample values pF[x][y] with x=−1, y=−1 . . . (nTbWidth+nTbHeight)−1 and x=0 . . . (nTbWidth+nTbHeight)−1, y=−1 are derived as follows:

$$pF[-1][-1]=(f[0]*p[-1][0]+f[1]*p[-1][-1]+f[2]*p[0][-1]+4)>>3 \quad (8\text{-}35)$$

$$pF[-1][y]=(f[0]*p[-1][y+1]+f[1]*p[-1][y]+f[2]*p[-1][y-1]+4)>>3 \text{ for } y=0 \ldots nTbS*2-2 \quad (8\text{-}36)$$

$$pF[-1][nTbS*2-1]=p[-1][nTbS*2-1] \quad (8\text{-}37)$$

$$pF[x][-1]=(f[0]*p[x-1][-1]+f[1]*p[x][-1]+f[1]*p[x+1][-1]+4)>>3 \text{ for } x=0 \ldots nTbS*2-2 \quad (8\text{-}38)$$

$$pF[nTbS*2-1][-1]=p[nTbS*2-1][-1] \quad (8\text{-}39)$$

As noted above, a video coder may generate multiple sets of smoothed reference samples and then select one of the sets of smoothed reference samples for use in the simplified PDPC techniques of this disclosure. The following section of codec specification text entitled "Generation of multiple sets of intra prediction reference samples" describes one example way of generating the multiple sets of smoothed reference samples.

Generation of Multiple Sets of Intra Prediction Reference Samples

Inputs to this process are:
  the unfiltered neighbouring samples unfiltRef [x][y], with x=−1, y=−1 . . . (nTbWidth+nTbHeight)−1 and x=0 . . . (nTbWidth+nTbHeight)−1, y=−1,
  a variable nTbWidth and nTbHeight specifying the prediction block width and height.

Outputs of this process are the filtered samples filtRef [2][x][y], with x=−1, y=−1 . . . (nTbWidth+nTbHeight)−1 and x=0 . . . (nTbWidth+nTbHeight)−1, y=−1.

1. The filtering process of neighbouring samples specified in the "Filtering process of neighboring samples" section is invoked with the sample array unfiltRef and the transform block size nTbWidth and nTbHeight as inputs, and the output is assigned to the sample array filtRef [0][x][y].
2. The filtering process of neighbouring samples specified in the "Filtering process of neighboring samples" section is invoked with the sample array filtRef [0][x][y] and the transform block size nTbWidth and nTbHeight as inputs, and the output is assigned to the sample array filtRef [1][x][y].

The following section of codec specification text entitled "Specification of intra prediction mode INTRA_PLANAR" describes a process for determining samples of a predictor block using the simplified PDPC techniques of this disclosure with the Planar intra prediction mode.

Specification of Intra Prediction Mode INTRA_PLANAR

Inputs to this process are:
  the unfiltered neighbouring samples unfiltRef[x][y], with x=−1, y=−1 . . . nTbHeight*2−1 and x=0 . . . nTbWidth*2−1, y=−1,
  the filtered neighbouring samples filtRef[x][y], with x=−1, y=−1 . . . nTbHeight*2−1 and x=0 . . . nTbWidth*2−1, y=−1,
  a variable nTbWidth and nTbHeight specifying the prediction block width and height.

Outputs of this process are the predicted samples predSamples[x][y], with x, y=0 . . . nTbS−1.

<highlight>The value of rightShift is derived as (log 2(nTbWidth)+1+log 2(nTbHeight)+1)>>2;</highlight>

For each sample location (x, y), the value of the prediction sample predSamples[x][y], with x, y=0 . . . nTbS−1, is derived as follows:

<highlight>wT=32>>((y<<1)>>rightShift);

wL=32>>((x<<1)>>rightShift);

wTL=(wL>>4)+(wT>>4);</highlight> predPlanar=((nTbS−1−x)*filtRef[−1][y]+(x+1)*filtRef[nTbS][−1]+(nTbS−1−y)*filtRef[x][−1]+(y+1)*filtRef[−1][nTbS]+nTbS)>>(Log 2(nTbS)+1)  (8-40)

<highlight>predSamples[x][y]=wL*unfiltRef[−1][y]+wT*unfiltRef[x][−1]−wTL*unfiltRef[−1][−1](64−wL−wT+wTL)*predPlanar+32)>>6  (8-41)
</highlight>

The following section of codec specification text entitled "Specification of intra prediction mode INTRA_DC" describes a process for determining samples of a predictor block using the simplified PDPC techniques of this disclosure with the DC intra prediction mode.

Specification of Intra Prediction Mode INTRA_DC
Inputs to this process are:
 the unfiltered neighbouring samples unfiltRef[x][y], with x=−1, y=−1 . . . nTbHeight*2−1 and x=0 . . . nTbWidth*2−1, y=−1,
 a variable nTbWidth and nTbHeight specifying the prediction block width and height.
Outputs of this process are the predicted samples predSamples[x][y], with x, y=0 . . . nTbS−1.

<highlight>The value of rightShift is derived as (log 2(nTbWidth)+1+log 2(nTbHeight)+1)>>2;</highlight>

The values of the prediction samples predSamples[x][y], with x, y=0 . . . nTbS−1, are derived by the following ordered steps:
 1. A variable dcVal is derived as follows:

$$predDC = \left( \sum_{x'=0}^{nTbS-1} p[x'][-1] + \sum_{y'=0}^{nTbS-1} p[-1][y'] + nTbS \right) >> (k+1) \quad (8\text{-}41)$$

where k=Log 2(nTbS).
 2. For each sample location (x, y), the value of the prediction sample predSamples[x][y], with x, y=0 . . . nTbS−1, is derived as follows:

<highlight>wT=32>>((y<<1)>>rightShift);

wL=32>>((x<<1)>>rightShift);

wTL=(wL>>4)+(wT>>4);

predSamples[x][y]=wL*unfiltRef[−1][y]+wT*unfiltRef[x][−1]−wTL*unfiltRef[−1][−1](64−wL−wT+wTL)*predDC+32)>>6  (8-43)
</highlight>

The following section of codec specification text entitled "Specification of intra prediction mode INTRA_HOR" describes a process for determining samples of a predictor block using the simplified PDPC techniques of this disclosure with the horizontal intra prediction mode.

Specification of Intra Prediction Mode INTRA_HOR
Inputs to this process are:
 the unfiltered neighbouring samples unfiltRef[x][y], with x=−1, y=−1, 0, . . . , nTbHeight*2−1, and x=0, 1, nTbWidth*2−1, y=−1,
 a variable nTbWidth and nTbHeight specifying the prediction block width and height.
Outputs of this process are the predicted samples predSamples[x][y], with x, y=0 . . . nTbS−1.

<highlight>The value of rightShift is derived as (log 2(nTbWidth)+1+log 2(nTbHeight)+1)>>2;</highlight>

For each sample location (x, y), the value of the prediction sample predSamples[x][y], with x, y=0 . . . nTbS−1, is derived as follows:

<highlight>wT=32>>((y<<1)>>rightShift);

wL=32>>((x<<1)>>rightShift);

wTL=wT;

predSamples[x][y]=wL*unfiltRef[−1][y]+wT*unfiltRef[x][−1]−wTL*unfiltRef[−1][−1](64−wL−wT+wTL)*unfiltRef[−1][y]+32)>>6  (8-43)
</highlight>

The following section of codec specification text entitled "Specification of intra prediction mode INTRA_VER" describes a process for determining samples of a predictor block using the simplified PDPC techniques of this disclosure with the vertical intra prediction mode.

Specification of Intra Prediction Mode INTRA_VER
Inputs to this process are:
 the unfiltered neighbouring samples unfiltRef[x][y], with x=−1, y=−1 . . . nTbHeight*2−1 and x=0 . . . nTbWidth*2−1, y=−1,
 a variable nTbWidth and nTbHeight specifying the prediction block width and height.
Outputs of this process are the predicted samples predSamples[x][y], with x, y=0 . . . nTbS−1.

<highlight>The value of rightShift is derived as (log 2(nTbWidth)+1+log 2(nTbHeight)+1)>>2;</highlight>

For each sample location (x, y), the value of the prediction sample predSamples[x][y], with x, y=0 . . . nTbS−1, is derived as follows:

<highlight>wT=32>>((y<<1)>>rightShift);

wL=32>>((x<<1)>>rightShift);

wTL=wL;

predSamples[x][y]=wL*unfiltRef[−1][y]+wT*unfiltRef[x][−1]−wTL*unfiltRef[−1][−1](64−wL−wT+wTL)*unfiltRef[x][−1]+32)>>6  (8-43)
</highlight>

Figure 8:
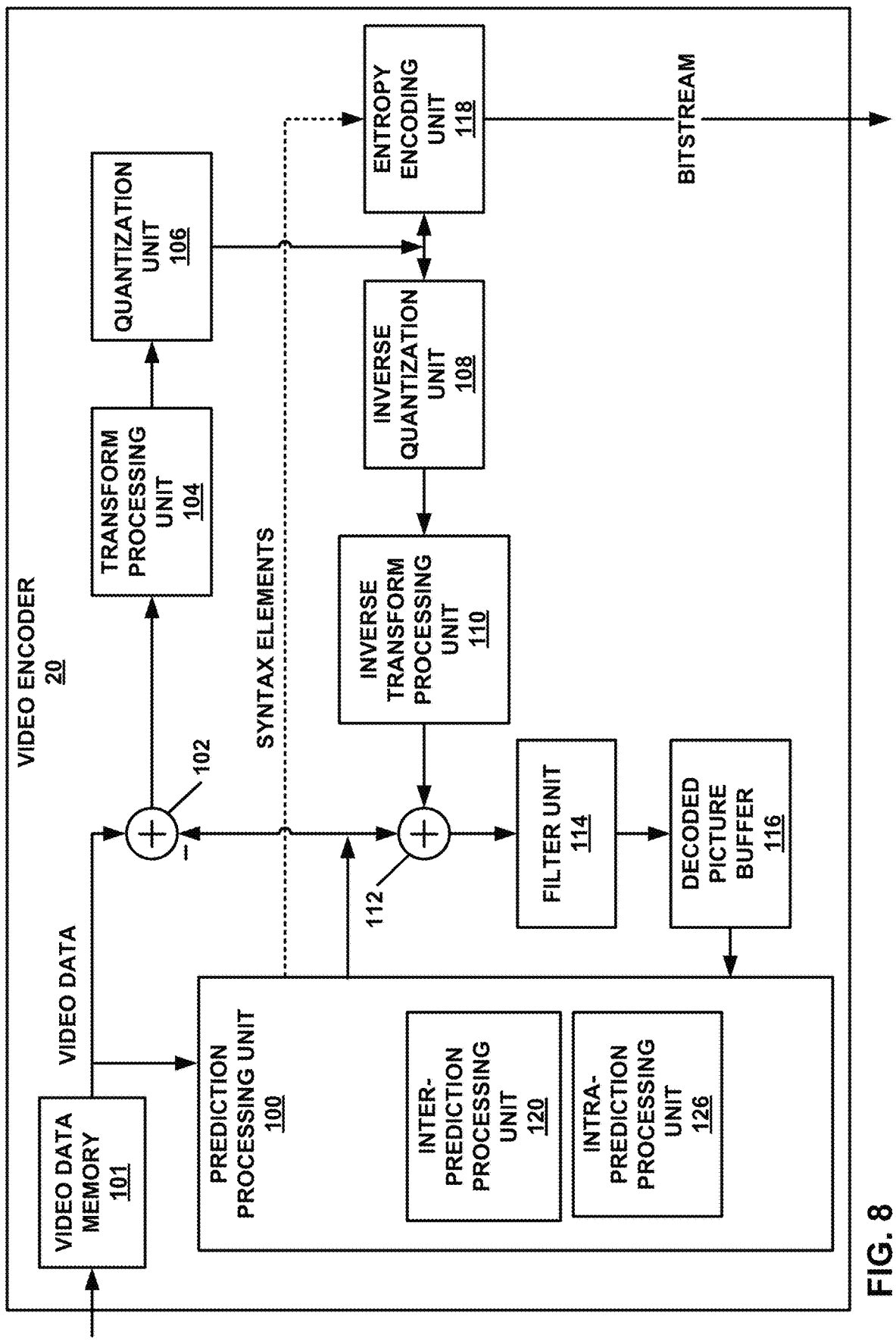
FIG. 8 is a block diagram illustrating an example video encoder that may implement one or more techniques described in this disclosure.

FIG. 8 is a block diagram illustrating an example video encoder 20 that may implement the techniques of this disclosure. FIG. 8 is provided for purposes of explanation and should not be considered limiting of the techniques as broadly exemplified and described in this disclosure. The techniques of this disclosure may be applicable to various coding standards or methods.

Processing circuitry includes video encoder 20, and video encoder 20 is configured to perform one or more of the example techniques described in this disclosure. For instance, video encoder 20 includes integrated circuitry, and the various units illustrated in FIG. 8 may be formed as hardware circuit blocks that are interconnected with a circuit bus. These hardware circuit blocks may be separate circuit blocks or two or more of the units may be combined into a common hardware circuit block. The hardware circuit blocks may be formed as a combination of electronic components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 8 are software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

In the example of FIG. 8, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU. As part of generating the predictive data for a PU, inter-prediction processing unit 120 performs inter prediction on the PU. The predictive data for the PU may include predictor blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block may be formed using spatial prediction from previously-encoded neighboring blocks within the same frame. If a PU is in a P slice, inter-prediction processing unit 120 may use uni-directional inter prediction to generate a predictor block of the PU. If a PU is in a B slice, inter-prediction processing unit 120 may use uni-directional or bi-directional inter prediction to generate a predictor block of the PU.

Intra-prediction processing unit 126 may generate predictive data for a PU by performing intra prediction on the PU. The predictive data for the PU may include predictor blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use reconstructed samples from sample blocks of neighboring PUs to generate a predictor block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU. Intra-prediction processing unit 126 may perform intra prediction techniques of this disclosure.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictor blocks of the selected predictive data may be referred to herein as the selected predictor blocks.

Intra-prediction processing unit 126 may generate a predictor block using an intra prediction mode in accordance with any of the techniques of this disclosure. For example, as part of generating the predictor block, intra-prediction processing unit 126 may determine an initial value of a first weight and determine an initial value of a second weight. Furthermore, for each respective sample in a set of samples in the predictor block, intra-prediction processing unit 126 may determine, based on the initial value of the first weight and a distance between the respective sample and a first boundary of the predictor block, a value of the first weight for the respective sample. Intra-prediction processing unit 126 may also determine, based on the initial value of the second weight and a distance between the respective sample and a second boundary of the predictor block, a value of the second weight for the respective sample. Furthermore, intra-prediction processing unit 126 may determine a value of a third weight for the respective sample. Intra-prediction processing unit 126 may also determine a value of a fourth weight for the respective sample based on the value of the first weight for the respective sample, the value of the second weight for the respective sample, and the value of the third weight for the respective sample. Additionally, intra-prediction processing unit 126 may determine a primary value for the respective sample according to the intra prediction mode. Next, intra-prediction processing unit 126 may determine a secondary value for the respective sample as a first value for the respective sample right-shifted by a second value, the first value for the respective sample being a sum of:

(i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by an above-left reference sample for the respective sample that is above and left of the respective sample, (iv) the value of the fourth weight for the respective sample multiplied by the primary value for the respective sample, and (v) an offset value.

For instance, intra-prediction processing unit 126 may determine the secondary value for the respective sample in accordance with equation (11), where wT is the first weight, wL is the second weight, wTL is the third weight, and $(2^{rightShift}-wT-wL-wTL)$ is the fourth weight, and rightShift is the second value.

Residual generation unit 102 may generate, based on the coding blocks (e.g., luma, Cb and Cr coding blocks) for a CU and the selected predictor blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictor block of a PU of the CU.

Transform processing unit 104 may perform partition the residual blocks of a CU into transform blocks of TUs of the CU. For instance, transform processing unit 104 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictor blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents values of transform coefficients for a CU.

Figure 9:
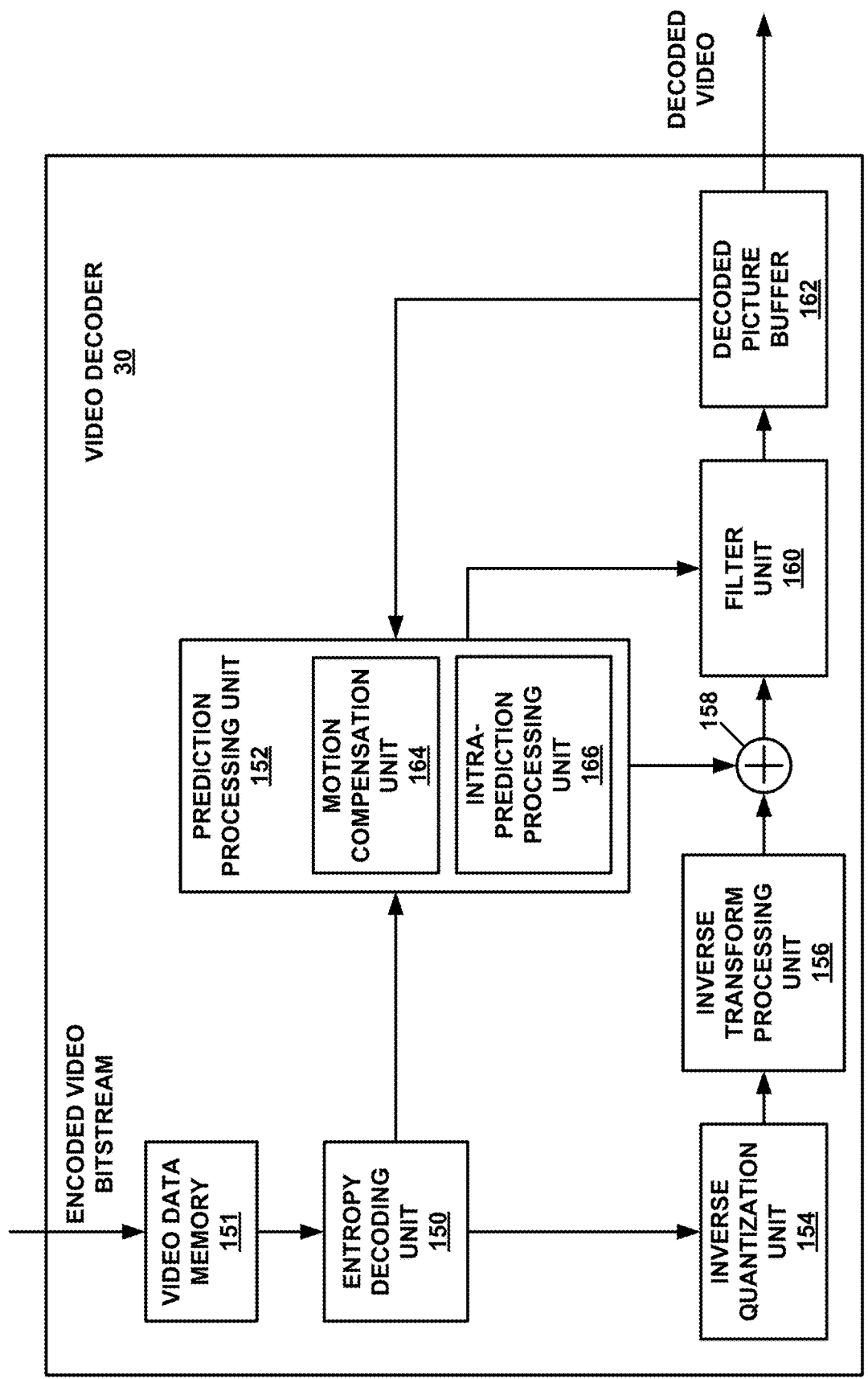
FIG. 9 is a block diagram illustrating an example video decoder that may implement one or more techniques described in this disclosure.

FIG. 9 is a block diagram illustrating an example video decoder 30 that is configured to implement the techniques of this disclosure. FIG. 9 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods, such as Versatile Video Coding (VVC).

Processing circuitry includes video decoder 30, and video decoder 30 is configured to perform one or more of the example techniques described in this disclosure. For instance, video decoder 30 includes integrated circuitry, and the various units illustrated in FIG. 9 may be formed as hardware circuit blocks that are interconnected with a circuit bus. These hardware circuit blocks may be separate circuit blocks or two or more of the units may be combined into a common hardware circuit block. The hardware circuit blocks may be formed as a combination of electronic components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 9 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 9, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictor blocks of the PU. Intra-prediction processing unit 166 may use an intra prediction mode to generate the predictor blocks of the PU based on samples spatially-neighboring blocks. Intra-prediction processing unit 166 may determine the intra prediction mode for the PU based on one or more syntax elements obtained from the bitstream. Intra-prediction processing unit 166 may perform intra prediction techniques of this disclosure.

Intra-prediction processing unit 166 may generate a predictor block using an intra prediction mode in accordance with any of the techniques of this disclosure. For example, as part of generating the predictor block, intra-prediction processing unit 166 may determine an initial value of a first weight and determine an initial value of a second weight. Furthermore, for each respective sample in a set of samples in the predictor block, intra-prediction processing unit 166 may determine, based on the initial value of the first weight and a distance between the respective sample and a first boundary of the predictor block, a value of the first weight for the respective sample. Intra-prediction processing unit 166 may also determine, based on the initial value of the second weight and a distance between the respective sample and a second boundary of the predictor block, a value of the second weight for the respective sample. Furthermore, intra-prediction processing unit 166 may determine a value of a third weight for the respective sample. Intra-prediction processing unit 166 may also determine a value of a fourth weight for the respective sample based on the value of the first weight for the respective sample, the value of the second weight for the respective sample, and the value of the third weight for the respective sample. Additionally, intra-prediction processing unit 166 may determine a primary value for the respective sample according to the intra prediction mode. Next, intra-prediction processing unit 166 may determine a secondary value for the respective sample as a first value for the respective sample right-shifted by a second value, the first value for the respective sample being a sum of:

(i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by an above-left reference sample for the respective sample that is above and left of the respective sample, (iv) the value of the fourth weight for the respective sample multiplied by the primary value for the respective sample, and (v) an offset value.

For instance, intra-prediction processing unit 166 may determine the secondary value for the respective sample in accordance with equation (11), where wT is the first weight, wL is the second weight, wTL is the third weight, ($2^{rightShift}$−wT−wL−TL) is the fourth weight, and rightShift is the second value.

If a PU is encoded using inter prediction, motion compensation unit 164 may determine motion information for the PU. Motion compensation unit 164 may determine, based on the motion information of the PU, one or more reference blocks. Motion compensation unit 164 may generate, based on the one or more reference blocks, predictor blocks (e.g., predictive luma, Cb and Cr blocks) for the PU.

Reconstruction unit 158 may use transform blocks (e.g., luma, Cb and Cr transform blocks) for TUs of a CU and the predictor blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictor blocks (e.g., luma, Cb and Cr predictor blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Figure 10:
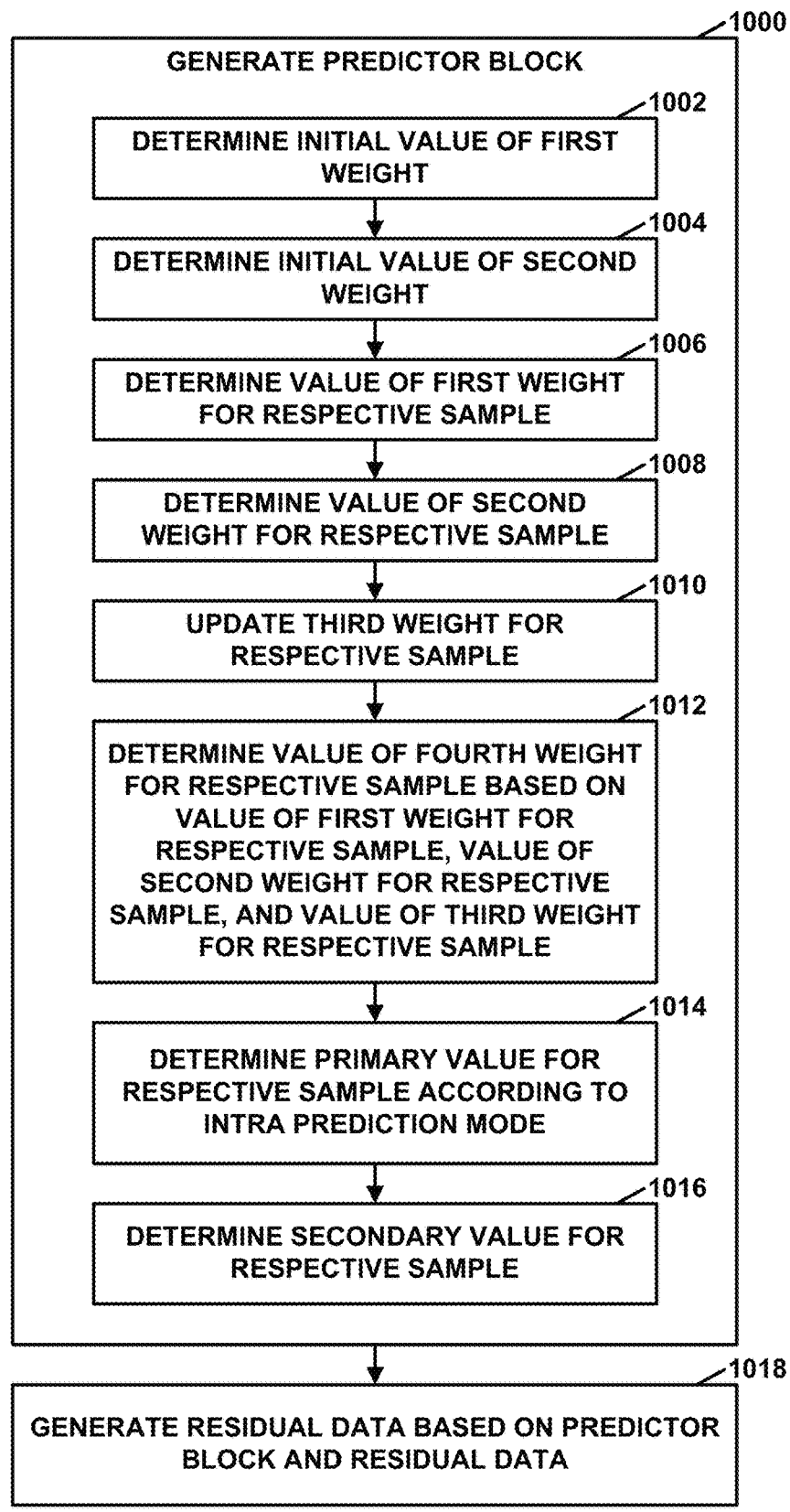
FIG. 10 is a flowchart illustrating an example operation of a video encoder in accordance with a technique of this disclosure.

FIG. 10 is a flowchart illustrating an example operation of video encoder 20 in accordance with a technique of this disclosure. The flowcharts of this disclosure are provided as examples. In other examples, operations may include more, fewer, or different actions. Moreover, in some examples, operations may be performed in different orders.

In the example of FIG. 10, video encoder 20 (e.g., intra-prediction processing unit 126 (FIG. 8) of video encoder 20) may generate a predictor block using an intra prediction mode (1000). In some examples, the intra prediction mode is a DC intra prediction mode. In some examples, the intra prediction mode is a horizontal intra prediction mode. In some examples, the intra prediction mode is a vertical intra prediction mode. In some examples, the intra prediction mode may be another type of intra prediction mode. In some examples, each of the samples in the predictor block is a luma sample. In some examples, each of the samples in the predictor block is a chroma sample. In some examples, video encoder 20 may apply the operation of FIG. 10 to both luma and chroma samples.

As part of generating the predictor block, video encoder 20 may determine an initial value of a first weight (1002). Additionally, video encoder 20 may determine an initial value of a second weight (1004). In some examples, the initial value of the first weight and the initial value of the second weight may be fixed and predetermined. In some examples, wL and wT are initialized as 0.5. In some examples, video encoder 20 may determine the initial value of the first weight and the initial value of the second weight based on one or more factors, such as a size of the predictor block or the inter prediction mode.

Furthermore, for each respective sample in a set of samples in the predictor block, video encoder 20 may determine, based on the initial value of the first weight and a distance between the respective sample and a first boundary of the predictor block, a value of the first weight for the respective sample (1006). The first boundary may be a top boundary of the predictor block. In some examples, video encoder 20 may determine the value of the first weight for the respective sample by performing a shift operation on the initial value of the first weight by an amount based on the distance between the respective sample and the first boundary of the predictor block. For instance, in the sections of this disclosure entitled "Specification of intra prediction mode INTRA_PLANAR," "Specification of intra prediction mode INTRA_DC," "Specification of intra prediction mode INTRA_HOR," and "Specification of intra prediction mode INTRA_VER," video encoder 20 may determine the value of the first weight for the respective sample as 32>>((y<<1)>>rightShift), where 32 is the initial value of the first weight and y is a distance in samples from a top boundary of the predictor block. In other examples, video encoder 20 may determine the value of the first weight for the respective sample by dividing the initial value of the first weight by an amount based on the distance between the respective sample and the first boundary of the predictor block.

The set of samples in the predictor block may include each sample of the predictor block. In other examples, the set of samples in the predictor block may be a subset of the samples in the predictor block. In other words, in some examples, the simplified PDPC techniques of this disclosure are only applied to selected prediction sample positions rather than being applying to the entire predictor block. For example, the selected prediction sample positions upon which the simplified PDPC techniques of this disclosure are applied may be a pre-defined number of columns of the predictor block starting from the left of the predictor block and/or pre-defined number of rows of the predictor block starting from the top of the predictor block.

Video encoder 20 may also determine, based on the initial value of the second weight and a distance between the respective sample and a second boundary of the predictor block, a value of the second weight for the respective sample (1008). The second boundary may be a left boundary of the predictor block. In some examples, video encoder 20 may determine the value of the second weight for the respective sample by performing a shift operation on the initial value of the second weight by an amount based on the distance between the respective sample and the second boundary of the predictor block. For instance, in the sections of this disclosure entitled "Specification of intra prediction mode INTRA_PLANAR," "Specification of intra prediction mode INTRA_DC," "Specification of intra prediction mode INTRA_HOR," and "Specification of intra prediction mode INTRA_VER," video encoder 20 may determine the value of the second weight for the respective sample as 32>>((x<<1)>>rightShift), where 32 is the initial value of the second weight, x is a distance in samples from a left boundary of the predictor block, and rightShift is a value by which to right shift (x<<1). In some examples, video encoder 20 may determine the second weight for the respective sample by dividing the initial value of the second weight by an amount based on the distance between the respective sample and the second boundary of the predictor block.

In some examples, video encoder 20 may determine the value of the first weight for the respective sample based on one or more of: a scaled horizontal coordinate of the current sample, a block size of the predictor block, or the intra prediction mode. In some examples, video encoder 20 may derive the value of the second weight for the respective sample based on one or more of: a scaled vertical coordinate of the respective sample, the block size of the predictor block, or the intra prediction mode.

Furthermore, video encoder 20 may determine a value of a third weight for the respective sample (1010). Video encoder 20 may determine the value of the third weight for the respective sample in one or more of various ways. For example, video encoder 20 may determine the value of the third weight for the respective sample as (wL>>4)+(wT>>4), where wL is the value of the first weight for the respective sample, wT is the value of the second weight for the respective sample, and >> is the right-shift operation. In another example, video encoder 20 may determine the value of the third weight for the respective sample as −(wL>>4)−(wT>>4), where wL is the value of the first weight for the respective sample, wT is the value of the second weight for the respective sample, and >> is the right-shift operation.

In some examples, video encoder 20 determines the value of the third weight for the respective sample based on the intra prediction mode. For instance, in one example, as shown in the sections of this disclosure entitled "Specification of intra prediction mode INTRA_PLANAR" and "Specification of intra prediction mode INTRA_DC," video encoder 20 may determine the value of the third weight for the respective sample as wTL=(wL>>4)+(wT>>4). In this example, as shown in the section of this disclosure entitled "Specification of intra prediction mode INTRA_HOR," video encoder 20 may determine the value of the third weight for the respective sample as wTL=wT. In this example, as shown in the section of this disclosure entitled "Specification of intra prediction mode INTRA_VER," video encoder 20 may determine the value of the fourth weight for the respective sample as wTL=wL.

In some examples, video encoder 20 may determine the value of the third weight for the respective sample as a sum of a first parameter multiplied by the value of the first weight for the respective sample plus a second parameter multiplied by the value of the second weight for the respective sample. As an example, video encoder 20 may determine the value of the third weight (wTL) as wTL=a·wL+b·wT Video encoder 20 may determine the values of the first parameter (a) and the second parameter (b) in accordance with any of the examples provided elsewhere in this disclosure. For instance, video encoder 20 may determine, based on an intra prediction direction, the values of the first parameter and the second parameter. In some examples, values of the first parameter and the second parameter are dependent on an intra prediction angle difference or an intra mode index difference relative to a horizontal and/or a vertical prediction direction.

In some examples, video encoder 20 may signal values of the first parameter and the second parameter in the bitstream. As noted elsewhere in this disclosure, the bitstream may include an encoded representation of the video data. For instance, video encoder 20 may include syntax elements specifying the first parameter and the second parameter in the bitstream.

Furthermore, in the example of FIG. 10, video encoder 20 may also determine a value of a fourth weight for the respective sample based on the value of the first weight for the respective sample, the value of the second weight for the respective sample, and the value of the third weight for the respective sample (1012). Video encoder 20 may determine the value of the fourth weight for the respective sample in one or more of various ways. For example, video encoder 20 may determine the value of the fourth weight for the respective sample as being equal to (64−wT−wL−wTL), where wT is the value of the second weight for the respective sample, wL is the value of the first weight for the respective sample, and wTL is the value of the third weight for the respective sample, and the second value (i.e., the right shift value) is equal to 6. In some examples, video encoder 20 may determine the value of the fourth weight for the respective sample as being equal to ($2^{rightShift}$−wT−wL−wTL), where wT is the value of the second weight for the respective sample, wL is the value of the first weight for the respective sample, and wTL is the value of the third weight for the respective sample.

Additionally, in the example of FIG. 10, video encoder 20 may determine a primary value for the respective sample according to the intra prediction mode (1014). For instance, video encoder 20 may determine the primary value of the respective sample using a Planar intra prediction mode, DC intra prediction mode, or directional intra prediction mode, as described elsewhere in this disclosure.

For example, video encoder 20 may determine the primary value for the respective sample based on reference samples in a current picture that contain the predictor block. For instance, in this example, video encoder 20 may determine the primary value for the respective sample based on reference samples of the predictor block. The reference samples of the predictor block may include decoded samples in a column left of the predictor block and decoded samples in a row above the predictor block. Thus, the reference samples of the predictor block may include a left reference sample for the respective sample that is left of the respective sample, an above reference sample for the current sample that is above the respective sample, and an above-left reference sample for the respective sample that is above and left of the respective sample. However, depending on the intra prediction mode, determining the primary value for the respective sample value based on the reference samples for the predictor block does not require video encoder 20 to use one or more, or any, of the left reference sample for the respective sample, the above reference sample for the respective sample, or the above-left reference sample for the respective sample. In some examples, video encoder 20 may determine the primary value for the respective sample based on reconstructed samples that are within the predictor block.

In some examples, video encoder 20 applies one or more filters to the reference samples and determines the primary value for the respective sample based on the filtered reference samples. For example, video encoder 20 may filter the reference samples in accordance with any of the examples provided elsewhere in this disclosure. In other examples, video encoder 20 may determine the primary value for the respective sample based on unfiltered reference samples.

Next, video encoder 20 may determine a secondary value for the respective sample as a first value for the respective sample right-shifted by a second value (1016). The first value for the respective sample may be a sum of:
(i) the value of the first weight for the respective sample, multiplied by a left reference sample for the respective sample that is left of the respective sample,
(ii) the value of the second weight for the respective sample multiplied by an above reference sample for the respective sample that is above the respective sample,
(iii) the value of the third weight for the respective sample multiplied by an above-left reference sample for the respective sample that is above and left of the respective sample,
(iv) the value of the fourth weight for the respective sample multiplied by the primary value for the respective sample, and
(v) an offset value.

For instance, video encoder 20 may determine the secondary value for the respective sample in accordance with equation (11), where wT is the first weight, wL is the second weight, wTL is the third weight, and ($2^{rightShift}$−wT−wL−wTL) is the fourth weight, and rightShift is the second value. In some examples, the offset value is equal to 32 and the second value is equal 6.

In some examples, video encoder 20 applies one or more filters to the reference samples (including the left reference sample, above reference sample, and above-left reference sample) and may determine the secondary value for the respective sample based on the filtered reference samples. For example, video encoder 20 may filter the reference samples in accordance with any of the examples provided elsewhere in this disclosure. The reference samples may be reference samples of the predictor block. That is, the reference samples may be in a column left of the predictor block and in a row above the predictor block. In examples where the reference samples are reference samples of the predictor block, video encoder 20 may generate the filtered reference samples of the predictor block by applying a filter to initial, unfiltered reference samples of the predictor block. In other examples, video encoder 20 may use unfiltered values of one or more of the left reference sample, the above reference sample, and the above-left reference sample to determine the secondary value for the respective sample.

In some examples, video encoder 20 only applies the simplified PDPC techniques of this disclosure for certain block sizes, (e.g., blocks with sizes greater than a threshold). Thus, in some examples, video encoder 20 may determine the secondary value for the respective sample is the first value right-shifted by the second value based on a size of the predictor block being greater than a predetermined threshold. Thus, in instances where the size of the predictor block is not greater than the threshold, the secondary value for the respective sample may be equal to the primary value for the respective sample.

Furthermore, in the example of FIG. 10, video encoder 20 may generate residual data based on the predictor block and a coding block of the video data (1018). For example, video encoder 20 may generate the residual data by subtracting samples of the coding block from corresponding samples of the predictor block.

Figure 11:
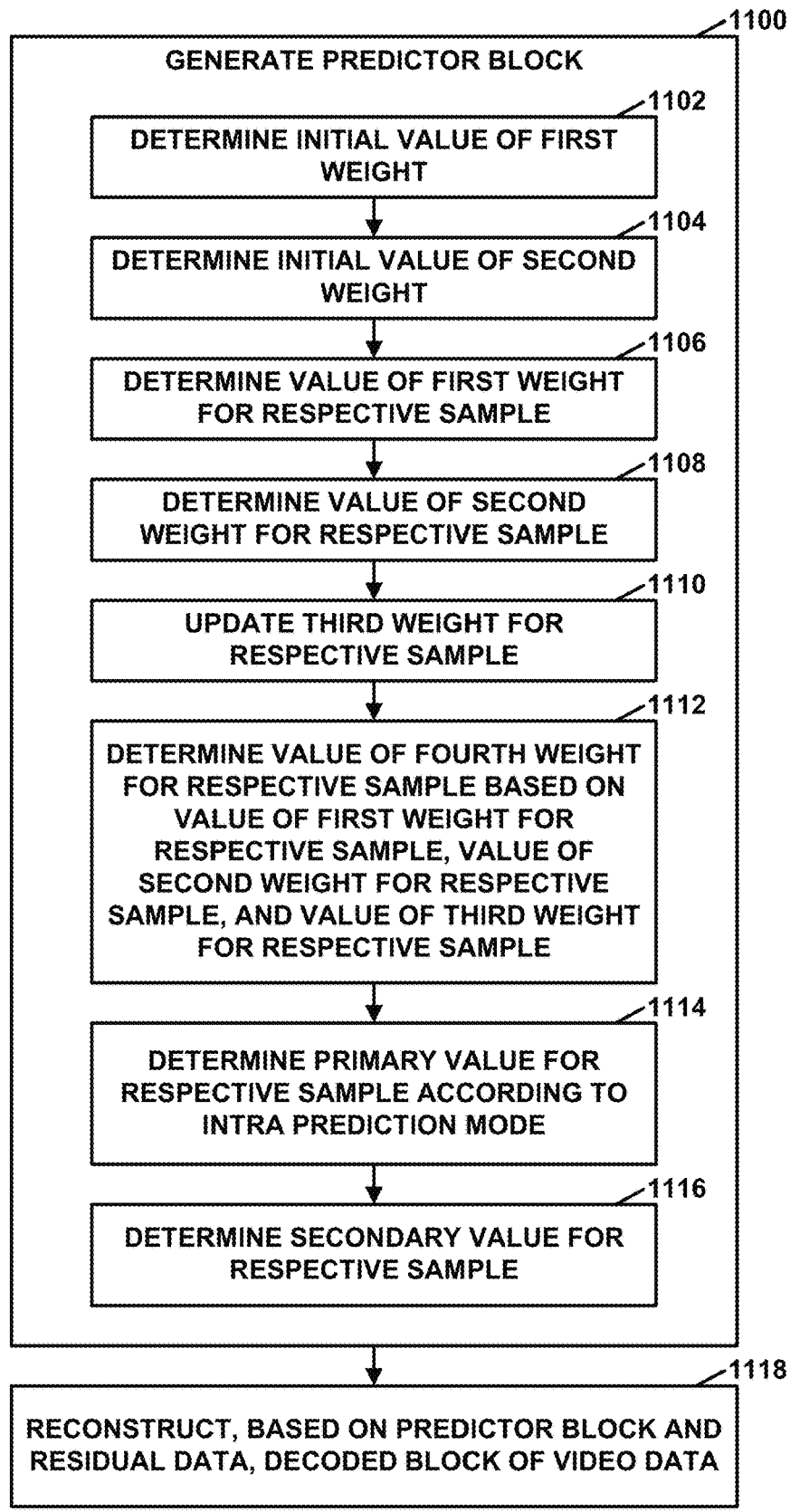
FIG. 11 is a flowchart illustrating an example operation of a video decoder in accordance with a technique of this disclosure.

FIG. 11 is a flowchart illustrating an example operation of video decoder 30 in accordance with a technique of this disclosure. In the example of FIG. 11, video decoder 30 (e.g., intra-prediction processing unit 166 (FIG. 9) of video decoder 30) may generate a predictor block using an intra prediction mode (1100). In some examples, the intra prediction mode is a DC intra prediction mode. In some examples, the intra prediction mode is a horizontal intra prediction mode. In some examples, the intra prediction mode is a vertical intra prediction mode. In some examples, the intra prediction mode may be another type of intra prediction mode. In some examples, each of the samples in the predictor block is a luma sample. In some examples, each of the samples in the predictor block is a chroma sample. In some examples, video decoder 30 may apply the operation of FIG. 10 to both luma and chroma samples.

As part of generating the predictor block, video decoder 30 may determine an initial value of a first weight (1102). Additionally, video decoder 30 may determine an initial value of a second weight (1104). Video decoder 30 may determine the initial value of the first weight and the initial value of the second weight in accordance with any of the examples provided with respect to actions (1002) and (1004) and elsewhere in this disclosure.

Furthermore, for each respective sample in a set of samples in the predictor block, video decoder 30 may determine, based on the initial value of the first weight and a distance between the respective sample and a first boundary of the predictor block, a value of the first weight for the respective sample (1106). The first boundary may be a top boundary of the predictor block. Video decoder 30 may also determine, based on the initial value of the second weight and a distance between the respective sample and a second boundary of the predictor block, a value of the second weight for the respective sample (1108). The second boundary may be a left boundary of the predictor block. Furthermore, video decoder 30 may determine a value of a third weight for the respective sample (1110). Video decoder 30 may also determine a value of a fourth weight for the respective sample based on the value of the first weight for the respective sample, the value of the second weight for the respective sample, and the value of the third weight for the respective sample (1112). Video decoder 30 may determine the values of the first, second, third, and fourth weights for the respective sample in the same manner as video encoder 20 as described above with respect to actions (1006), (1008), (1010) and (1012), and described elsewhere in this disclosure.

Additionally, in the example of FIG. 11, video decoder 30 may determine a primary value for the respective sample according to the intra prediction mode (1114). For instance, video decoder 30 may determine the primary value in the same manner as video encoder 20 as described above with respect to action (1014) and described elsewhere in this disclosure.

Next, video decoder 30 may determine a secondary value for the respective sample as a first value for the respective sample right-shifted by a second value (1116). The first value for the respective sample may be a sum of:
(i) the value of the first weight for the respective sample, multiplied by a left reference sample for the respective sample that is left of the respective sample,
(ii) the value of the second weight for the respective sample multiplied by an above reference sample for the respective sample that is above the respective sample, (iii) the value of the third weight for the respective sample multiplied by an above-left reference sample for the respective sample that is above and left of the respective sample, (iv) the value of the fourth weight for the respective sample multiplied by the primary value for the respective sample, and (v) an offset value.

For instance, video decoder 30 may determine the secondary value for the respective sample in accordance with equation (11), where wT is the first weight, wL is the second weight, wTL is the third weight, and ($2^{rightShift}$−wT−wL−wTL) is the fourth weight, and rightShift is the second value. In some examples, the offset value is equal to 32 and the second value is equal 6.

In some examples, video decoder 30 applies one or more filters to the reference samples (including the left reference sample, above reference sample, and above-left reference sample) and may determine the secondary value for the respective sample based on the filtered reference samples. For example, video decoder 30 may filter the reference samples in accordance with any of the examples provided elsewhere in this disclosure. The reference samples may be reference samples of the predictor block. That is, the reference samples may be in a column left of the predictor block and in a row above the predictor block. In examples where the reference samples are reference samples of the predictor block, video decoder 30 may generate the filtered reference samples of the predictor block by applying a filter to initial, unfiltered reference samples of the predictor block. In other examples, video decoder 30 may use unfiltered values of one or more of the left reference sample, the above reference sample, and the above-left reference sample to determine the secondary value for the respective sample.

In some examples, video decoder 30 only applies the simplified PDPC techniques of this disclosure for certain block sizes (e.g., blocks with sizes greater than a threshold). Thus, in some examples, video decoder 30 may determine the secondary value for the respective sample is the first value right-shifted by the second value based on a size of the predictor block being greater than a predetermined threshold. Thus, in instances where the size of the predictor block is not greater than the threshold, the secondary value for the respective sample may be equal to the primary value for the respective sample.

Furthermore, in the example of FIG. 11, video decoder 30 may reconstruct, based on the predictor block and residual data, a decoded block of the video data (1118). For example, video decoder 30 may generate the residual data by adding samples of the predictor block to samples of the residual data.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

The techniques may be applied to video coding in support of any of a variety of multimedia applications, such as over-the-air television broadcasts, cable television transmissions, wired transmissions, satellite television transmissions, Internet streaming video transmissions, such as dynamic adaptive streaming over HTTP (DASH), digital video that is encoded onto a data storage medium, decoding of digital video stored on a data storage medium, or other applications or combinations of the above examples. In some examples, system 10 may be configured to support one-way or two-way video transmission to support applications such as video streaming, video playback, video broadcasting, and/or video telephony.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media.

Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

In this disclosure, ordinal terms such as "first," "second," "third," and so on, are not necessarily indicators of positions within an order, but rather may simply be used to distinguish different instances of the same thing.

Various examples have been described. These and other examples are within the scope of the following claims.

What is claimed is:

1. A method of decoding video data, the method comprising:
    generating a predictor block using an intra prediction mode, wherein generating the predictor block comprises:
        for each respective sample in a set of samples in the predictor block:
            determining, based on a distance between the respective sample and a first boundary of the predictor block, a value of a first weight for the respective sample;
            determining, based on a distance between the respective sample and a second boundary of the predictor block, a value of a second weight for the respective sample;
            determining a value of a third weight for the respective sample based on the value of the first weight for the respective sample and the value of the second weight for the respective sample;
            determining a primary value for the respective sample according to the intra prediction mode; and
            determining a secondary value for the respective sample as a first value for the respective sample right-shifted by a second value, the first value for the respective sample being based on (i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by the primary value for the respective sample, and (iv) an offset value,
        wherein each respective sample in the predictor block is based on the primary value for the respective sample and the secondary value for the respective sample; and
    reconstructing, based on the predictor block and residual data, a decoded block of the video data.

2. The method of claim 1, wherein, for each respective sample in the set of samples in the predictor block, determining the primary value for the respective sample comprises determining the primary value for the respective sample based on reference samples of the predictor block, the reference samples including the left reference sample for the respective sample and the above reference sample for the respective sample.

3. The method of claim 2, wherein the reference samples of the predictor block are filtered reference samples and the method further comprises:
    generating the filtered reference samples of the predictor block by applying a filter to initial reference samples of the predictor block.

4. The method of claim 1, wherein, for each respective sample in the set of samples in the predictor block:
    determining the value of the first weight for the respective sample comprises determining the value of the first weight for the respective sample by performing a shift operation on an initial value of the first weight by an amount based on the distance between the respective sample and the first boundary of the predictor block; and
    determining the value of the second weight comprises determining the value of the second weight for the respective sample by performing the shift operation on an initial value of the second weight by an amount based on the distance between the respective sample and the second boundary of the predictor block.

5. The method of claim 1, wherein:
    the method further comprises determining a value of a fourth weight for the respective sample,
    for each respective sample in the set of samples in the predictor block, the value of the third weight for the respective sample is equal to (64-wT-wL-TL), where wT is the value of the second weight for the respective sample, wL is the value of the first weight for the respective sample, and wTL is the value of the fourth weight for the respective sample, the offset value is equal to 32, and the second value is equal to 6, and
    the first value for the respective sample is further based on the fourth weight for the respective sample multiplied by an above-left reference sample for the respective sample that is above and left of the respective sample.

6. The method of claim 1, wherein:
the method further comprises determining a value of a fourth weight for the respective sample as (wL>>4)+(wT>>4), where wL is the value of the first weight for the respective sample, wT is the value of the second weight for the respective sample, and >> is a right-shift operation, and
the first value for the respective sample is further based on the fourth weight for the respective sample multiplied by an above-left reference sample for the respective sample that is above and left of the respective sample.

7. The method of claim 1, further comprising, for each respective sample in the set of samples in the predictor block:
determining the value of a fourth weight for the respective sample as a sum of a first parameter multiplied by the value of the first weight for the respective sample plus a second parameter multiplied by the value of the second weight for the respective sample, and
the first value for the respective sample is further based on the fourth weight for the respective sample multiplied by an above-left reference sample for the respective sample that is above and left of the respective sample.

8. The method of claim 7, further comprising:
determining, based on an intra prediction direction, the values of the first parameter and the second parameter,
obtaining values of the first parameter and the second parameter from a bitstream that comprises an encoded representation of the video data, or
determining the values of the first parameter and the second parameter based on an intra prediction angle difference or an intra mode index difference relative to a horizontal and/or a vertical prediction direction.

9. The method of claim 1, wherein the intra prediction mode is a DC intra prediction mode, a horizontal intra prediction mode, or a vertical intra prediction mode.

10. A method of encoding video data, the method comprising:
generating a predictor block using an intra prediction mode, wherein generating the predictor block comprises:
for each respective sample in a set of samples in the predictor block:
determining, based on a distance between the respective sample and a first boundary of the predictor block, a value of a first weight for the respective sample;
determining, based on a distance between the respective sample and a second boundary of the predictor block, a value of a second weight for the respective sample;
determining a value of a third weight for the respective sample based on the value of the first weight for the respective sample and the value of the second weight for the respective sample;
determining a primary value for the respective sample according to the intra prediction mode; and
determining a secondary value for the respective sample as a first value for the respective sample right-shifted by a second value, the first value for the respective sample being based on (i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by the primary value for the respective sample, and (iv) an offset value,
wherein each respective sample in the predictor block is based on the primary value for the respective sample and the secondary value for the respective sample; and
generating residual data based on the predictor block and a coding block of the video data.

11. The method of claim 10, wherein, for each respective sample in the set of samples in the predictor block:
determining the value of the first weight for the respective sample comprises determining the value of the first weight for the respective sample by performing a shift operation on an initial value of the first weight by an amount based on the distance between the respective sample and the first boundary of the predictor block; and
determining the value of the second weight comprises determining the value of the second weight for the respective sample by performing the shift operation on an initial value of the second weight by an amount based on the distance between the respective sample and the second boundary of the predictor block.

12. The method of claim 10, wherein:
the method further comprises determining a value of a fourth weight for the respective sample as (wL >>4)+(wT>>4), where wL is the value of the first weight for the respective sample, wT is the value of the second weight for the respective sample, and >> is a right-shift operation, and
the first value for the respective sample is further based on the fourth weight for the respective sample multiplied by an above-left reference sample for the respective sample that is above and left of the respective sample.

13. The method of claim 10, further comprising, for each respective sample in the set of samples in the predictor block:
determining the value of a fourth weight for the respective sample as a sum of a first parameter multiplied by the value of the first weight for the respective sample plus a second parameter multiplied by the value of the second weight for the respective sample, and
the first value for the respective sample is further based on the fourth weight for the respective sample multiplied by an above-left reference sample for the respective sample that is above and left of the respective sample.

14. The method of claim 10, wherein the intra prediction mode is a DC intra prediction mode, a horizontal intra prediction mode, or a vertical intra prediction mode.

15. An apparatus for decoding video data, the apparatus comprising:
one or more storage media configured to store the video data; and
one or more processors configured to:
generate a predictor block using an intra prediction mode, wherein the one or more processors are configured such that, as part of generating the predictor block, the one or more processors:
for each respective sample in a set of samples in the predictor block:
determine, based on a distance between the respective sample and a first boundary of the predictor block, a value of a first weight for the respective sample;

determine, based on a distance between the respective sample and a second boundary of the predictor block, a value of a second weight for the respective sample;

determine a value of a third weight for the respective sample based on the value of the first weight for the respective sample and the value of the second weight for the respective sample;

determine a primary value for the respective sample according to the intra prediction mode; and determine a secondary value for the respective sample as a first value for the respective sample right-shifted by a second value, the first value for the respective sample being based on (i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by the primary value for the respective sample, and (iv) an offset value, wherein each respective sample in the predictor block is based on the primary value for the respective sample and the secondary value for the respective sample; and reconstruct, based on the predictor block and residual data, a decoded block of the video data.

16. The apparatus of claim 15, wherein, for each respective sample in the set of samples in the predictor block, the one or more processors are configured to determine the primary value for the respective sample based on reference samples of the predictor block, the reference samples including the left reference sample for the respective sample and the above reference sample for the respective sample.

17. The apparatus of claim 16, wherein the reference samples of the predictor block are filtered reference samples and the one or more processors are configured to generate the filtered reference samples of the predictor block by applying a filter to initial reference samples of the predictor block.

18. The apparatus of claim 15, wherein, for each respective sample in the set of samples in the predictor block, the one or more processors are configured to:

determine the value of the first weight for the respective sample by performing a shift operation on an initial value of the first weight by an amount based on the distance between the respective sample and the first boundary of the predictor block; and determine the value of the second weight for the respective sample by performing the shift operation on an initial value of the second weight by an amount based on the distance between the respective sample and the second boundary of the predictor block.

19. The apparatus of claim 15, wherein:

the one or more processors are further configured to determine a value of a fourth weight for the respective sample, and for each respective sample in the set of samples in the predictor block, the value of the third weight for the respective sample is equal to (64-wT-wL-TL), where wT is the value of the second weight for the respective sample, wL is the value of the first weight for the respective sample, and wTL is the value of the fourth weight for the respective sample, the offset value is equal to 32, and the second value is equal to 6, and the first value for the respective sample is further based on the fourth weight for the respective sample multiplied by an above-left reference sample for the respective sample that is above and left of the respective sample.

20. The apparatus of claim 15, wherein:

the one or more processors are further configured to determine a value of a fourth weight for the respective sample as (wL>>4)+(wT>>4), where wL is the value of the first weight for the respective sample, wT is the value of the second weight for the respective sample, and >> is a right-shift operation, and the first value for the respective sample is further based on the fourth weight for the respective sample multiplied by an above-left reference sample for the respective sample that is above and left of the respective sample.

21. The apparatus of claim 15, wherein, for each respective sample in the set of samples in the predictor block, the one or more processors are configured to determine the value of a fourth weight for the respective sample as a sum of a first parameter multiplied by the value of the first weight for the respective sample plus a second parameter multiplied by the value of the second weight for the respective sample, and the first value for the respective sample is further based on the fourth weight for the respective sample multiplied by an above-left reference sample for the respective sample that is above and left of the respective sample.

22. The apparatus of claim 21, wherein the one or more processors are further configured to:

determine, based on an intra prediction direction, the values of the first parameter and the second parameter, obtain values of the first parameter and the second parameter from a bitstream that comprises an encoded representation of the video data, or determine the values of the first parameter and the second parameter based on an intra prediction angle difference or an intra mode index difference relative to a horizontal and/or a vertical prediction direction.

23. The apparatus of claim 15, wherein the intra prediction mode is a DC intra prediction mode, a horizontal intra prediction mode, or a vertical intra prediction mode.

24. The apparatus of claim 23, wherein the apparatus comprises:

an integrated circuit, a microprocessor, or a wireless communication device.

25. An apparatus for encoding video data, the apparatus comprising:

one or more storage media configured to store the video data; and one or more processors configured to:

generate a predictor block using an intra prediction mode, wherein the one or more processors are configured such that, as part of generating the predictor block, the one or more processors:

for each respective sample in a set of samples in the predictor block:

determine, based on a distance between the respective sample and a first boundary of the predictor block, a value of a first weight for the respective sample;

determine, based on a distance between the respective sample and a second boundary of the predictor block, a value of a second weight for the respective sample;

determine a value of a third weight for the respective sample based on the value of the first weight for the respective sample and the value of the second weight for the respective sample;
determine a primary value for the respective sample according to the intra prediction mode; and
determine a secondary value for the respective sample as a first value for the respective sample right-shifted by a second value, the first value for the respective sample being based on (i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by the primary value for the respective sample, and (iv) an offset value,
wherein each respective sample in the predictor block is based on the primary value for the respective sample and the secondary value for the respective sample; and
generate residual data based on the predictor block and a coding block of the video data.

26. The apparatus of claim 25, wherein, for each respective sample in the set of samples in the predictor block, the one or more processors are configured to:
determine the value of the first weight for the respective sample by performing a shift operation on an initial value of the first weight by an amount based on the distance between the respective sample and the first boundary of the predictor block; and
determine the value of the second weight for the respective sample by performing the shift operation on an initial value of the second weight by an amount based on the distance between the respective sample and the second boundary of the predictor block.

27. The apparatus of claim 25, wherein:
the one or more processors are further configured to determine a value of a fourth weight for the respective sample as (wL>>4)+(wT>>4), where wL is the value of the first weight for the respective sample, wT is the value of the second weight for the respective sample, and >> is a right-shift operation, and
the first value for the respective sample is further based on the fourth weight for the respective sample multiplied by an above-left reference sample for the respective sample that is above and left of the respective sample.

28. The apparatus of claim 25, wherein, for each respective sample in the set of samples in the predictor block, the one or more processors are configured to determine a value of a fourth weight for the respective sample as a sum of a first parameter multiplied by the value of the first weight for the respective sample plus a second parameter multiplied by the value of the second weight for the respective sample, and
the first value for the respective sample is further based on the fourth weight for the respective sample multiplied by an above-left reference sample for the respective sample that is above and left of the respective sample.

29. The apparatus of claim 25, wherein the intra prediction mode is a DC intra prediction mode, a horizontal intra prediction mode, or a vertical intra prediction mode.

30. The apparatus of claim 25, wherein the apparatus comprises:
an integrated circuit,
a microprocessor, or
a wireless communication device.

31. A non-transitory computer-readable storage medium having instructions stored thereon that, when executed, cause one or more processors to:
generate a predictor block using an intra prediction mode, wherein the one or more processors are configured such that, as part of generating the predictor block, the one or more processors:
for each respective sample in a set of samples in the predictor block:
determine, based on a distance between the respective sample and a first boundary of the predictor block, a value of a first weight for the respective sample;
determine, based on a distance between the respective sample and a second boundary of the predictor block, a value of a second weight for the respective sample;
determine a value of a third weight for the respective sample based on the value of the first weight for the respective sample and the value of the second weight for the respective sample;
determine a primary value for the respective sample according to the intra prediction mode; and
determine a secondary value for the respective sample as a first value for the respective sample right-shifted by a second value, the first value for the respective sample being based on (i) the value of the first weight for the respective sample, multiplied by a left reference sample for the respective sample that is left of the respective sample, (ii) the value of the second weight for the respective sample multiplied by an above reference sample for the respective sample that is above the respective sample, (iii) the value of the third weight for the respective sample multiplied by the primary value for the respective sample, and (iv) an offset value,
wherein each respective sample in the predictor block is based on the primary value for the respective sample and the secondary value for the respective sample; and
reconstruct, based on the predictor block and residual data, a decoded block of video data.

32. The method of claim 1, wherein the third weight is further based on the intra prediction mode.

33. The method of claim 10, wherein the third weight is further based on the intra prediction mode.

34. The apparatus of claim 15, wherein the third weight is further based on the intra prediction mode.

35. The apparatus of claim 25, wherein the third weight is further based on the intra prediction mode.

36. The non-transitory computer-readable storage medium of claim 31,
wherein the third weight is further based on the intra prediction mode.

* * * * *